United States Patent [19]

Byrne et al.

[11] 3,742,878
[45] July 3, 1973

[54] CONTROL FOR SEWING MACHINE

[75] Inventors: James J. Byrne, Easton, Conn.;
Francis O. Blackwell, III, Seneca
Falls, N.Y.; Richard J. Shokite,
Stratford, Conn.

[73] Assignee: Warnaco Inc., Bridgeport, Conn.

[22] Filed: Dec. 7, 1970

[21] Appl. No.: 95,834

[52] U.S. Cl............ 112/121.12, 318/577, 250/202,
112/121.29
[51] Int. Cl............................................. D05b 21/00
[58] Field of Search................ 112/121.11, 121.12,
112/121.15, 121.14, 121.29, 2, 102, 204, 262,
260, 217.1, 217.3; 318/574, 576, 577, 578,
575; 250/202; 270/58, 53

[56] References Cited
UNITED STATES PATENTS

| | | | |
|---|---|---|---|
| 2,679,620 | 5/1954 | Berry | 112/102 UX |
| 3,437,813 | 4/1969 | Eisengrein et al. | 250/202 |
| 3,448,705 | 6/1969 | Scherr et al. | 112/121.12 |
| 3,451,366 | 6/1969 | Beck | 112/102 |
| 3,658,019 | 4/1972 | Levin et al. | 112/102 |
| 3,072,081 | 1/1963 | Milligan et al. | 112/121.12 |
| 3,355,641 | 11/1967 | Eisengrein et al. | 318/578 X |
| 3,450,076 | 6/1969 | Bender | 112/121.12 X |
| 3,170,423 | 2/1965 | Henebry | 112/121.12 |
| 3,224,393 | 12/1965 | Adams et al. | 112/121.12 |
| 2,970,557 | 2/1961 | Schwab et al. | 112/121.11 |
| 3,099,970 | 8/1963 | Hite | 112/121.14 |
| 3,531,107 | 9/1970 | Rovin et al. | 112/121.11 UX |
| 3,544,098 | 12/1970 | Hawley et al. | 112/2 X |
| 3,385,245 | 5/1968 | Ramsey et al. | 112/121.12 |
| 3,528,378 | 9/1970 | Westhoff | 112/121.15 |

*Primary Examiner*—James R. Boler
*Attorney*—Amster & Rothstein

[57] ABSTRACT

An apparatus and method for the stitching of a pattern in which material is moved relative to a stitching location in accordance with the X and Y coordinates of the stitching path, with the stitching tool being rotated on its axis at the stitching location in accordance with a trignometric function of the corresponding X and Y coordinates of the stitching path. The movement of the material in accordance with the X and Y coordinates of the stitching path steers the work relative to the stitching tool at the stitching location while the rotation of the stitching tool in accordance with the trignometric function of the corresponding X and Y coordinates of the stitching path continuously maintains the stitching tool in the appropriate orientation or heading relative to successive portions of the stitching path.

33 Claims, 23 Drawing Figures

INVENTORS
JAMES J. BYRNE
FRANCIS O. BLACKWELL III
BY  RICHARD J. SHOKITE

Ameter & Rothstein
ATTORNEYS

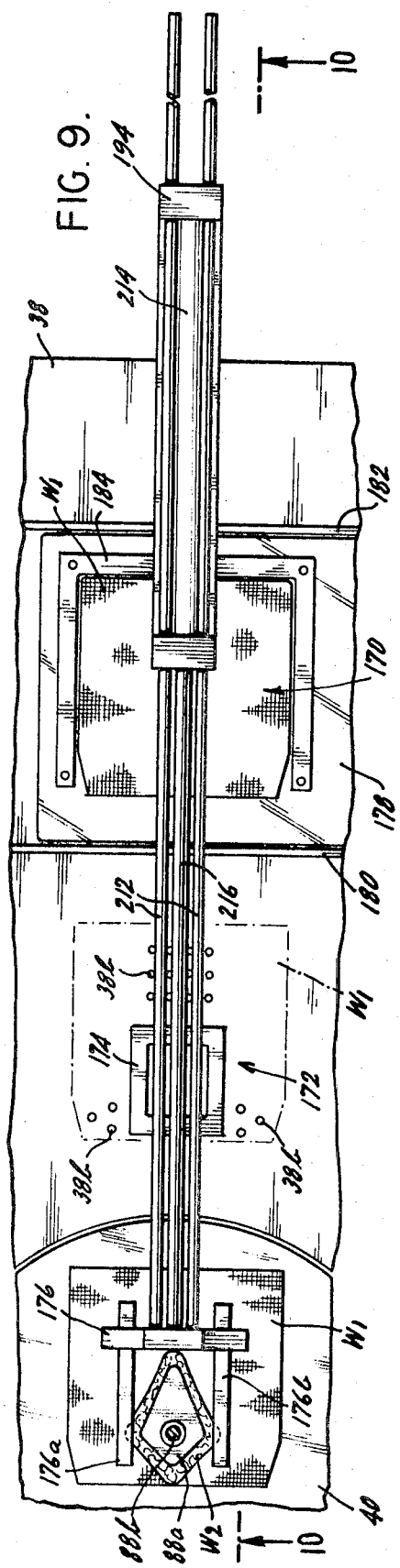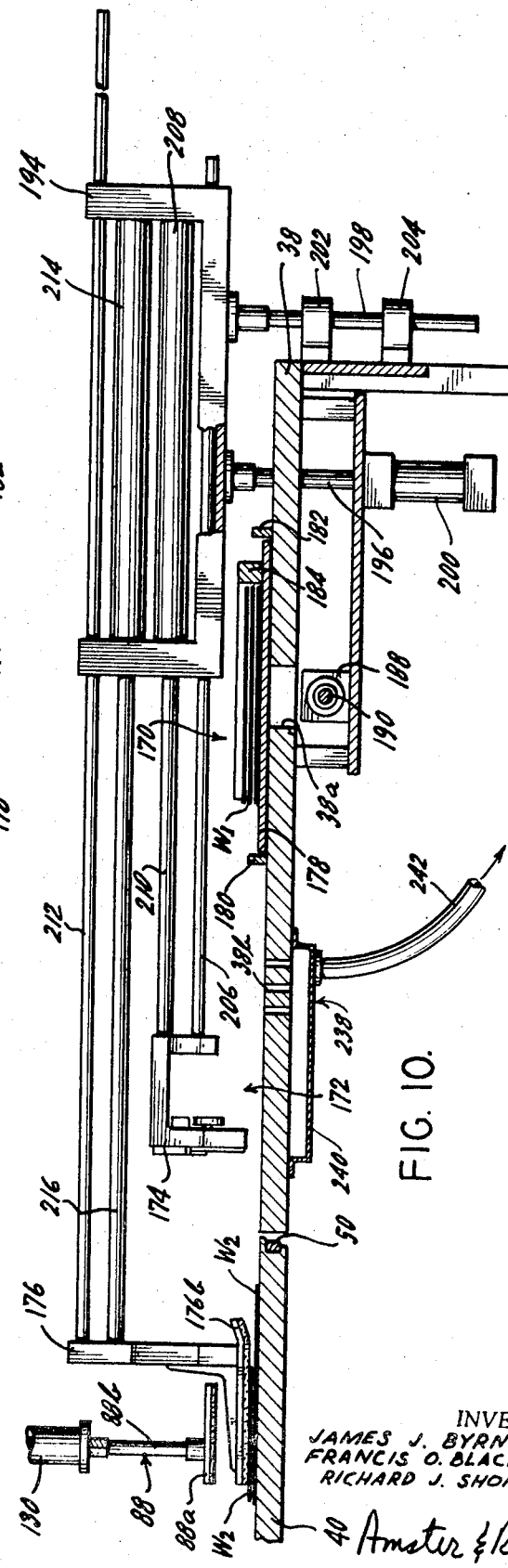
FIG. 9.
FIG. 10.
INVENTORS
JAMES J. BYRNE
FRANCIS O. BLACKWELL III
RICHARD J. SHOKITE
Amster & Rothstein
ATTORNEYS

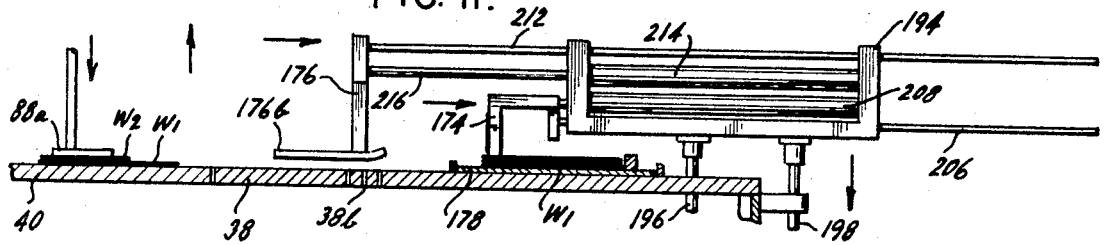
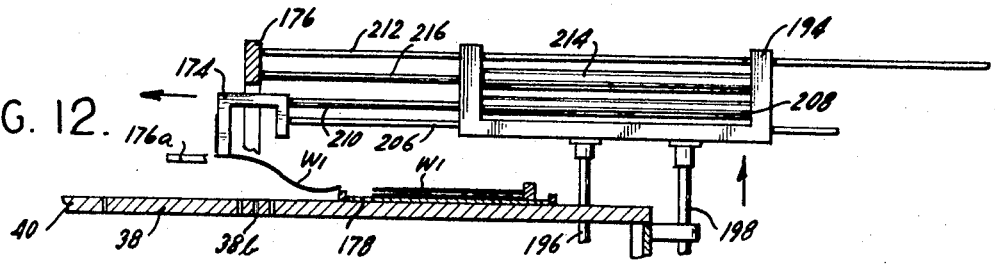
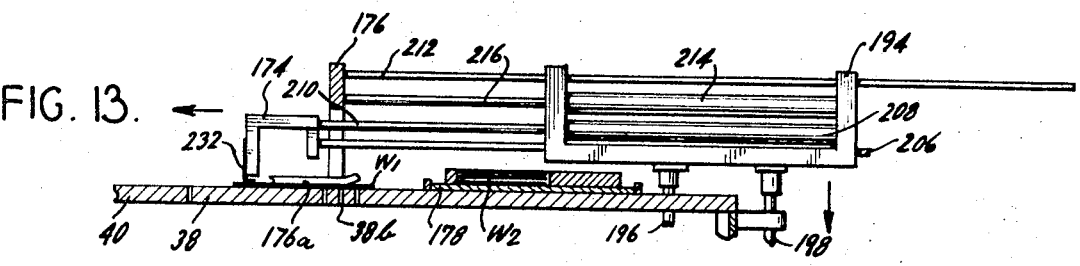
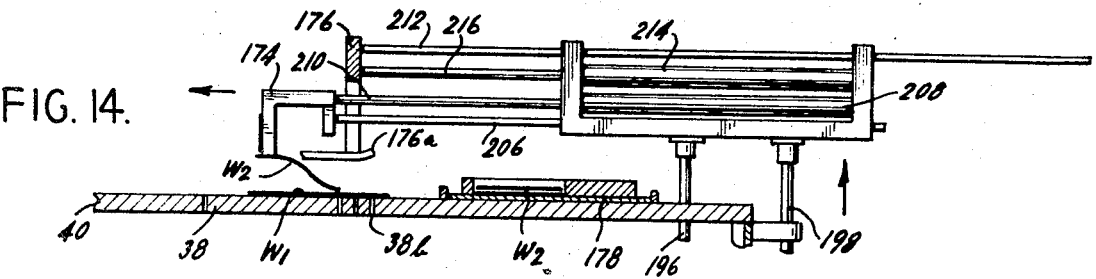
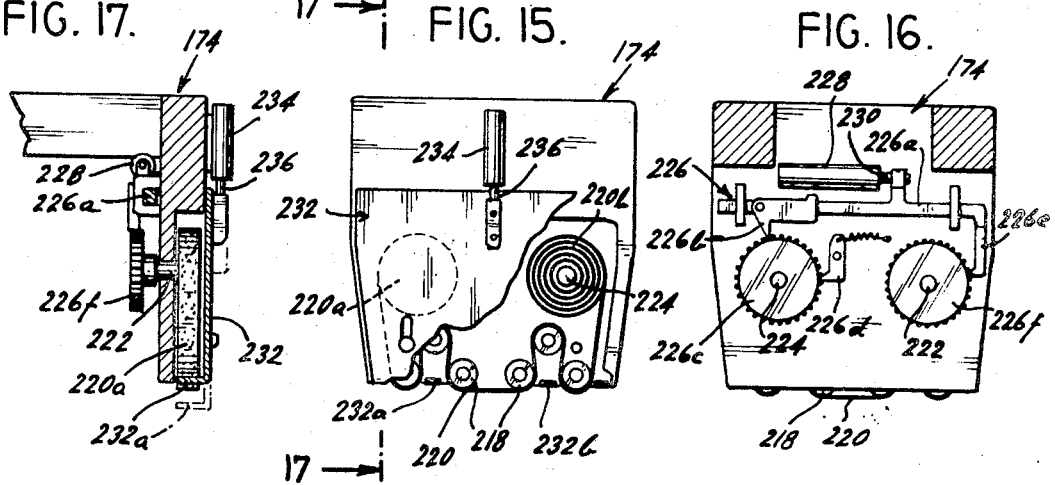

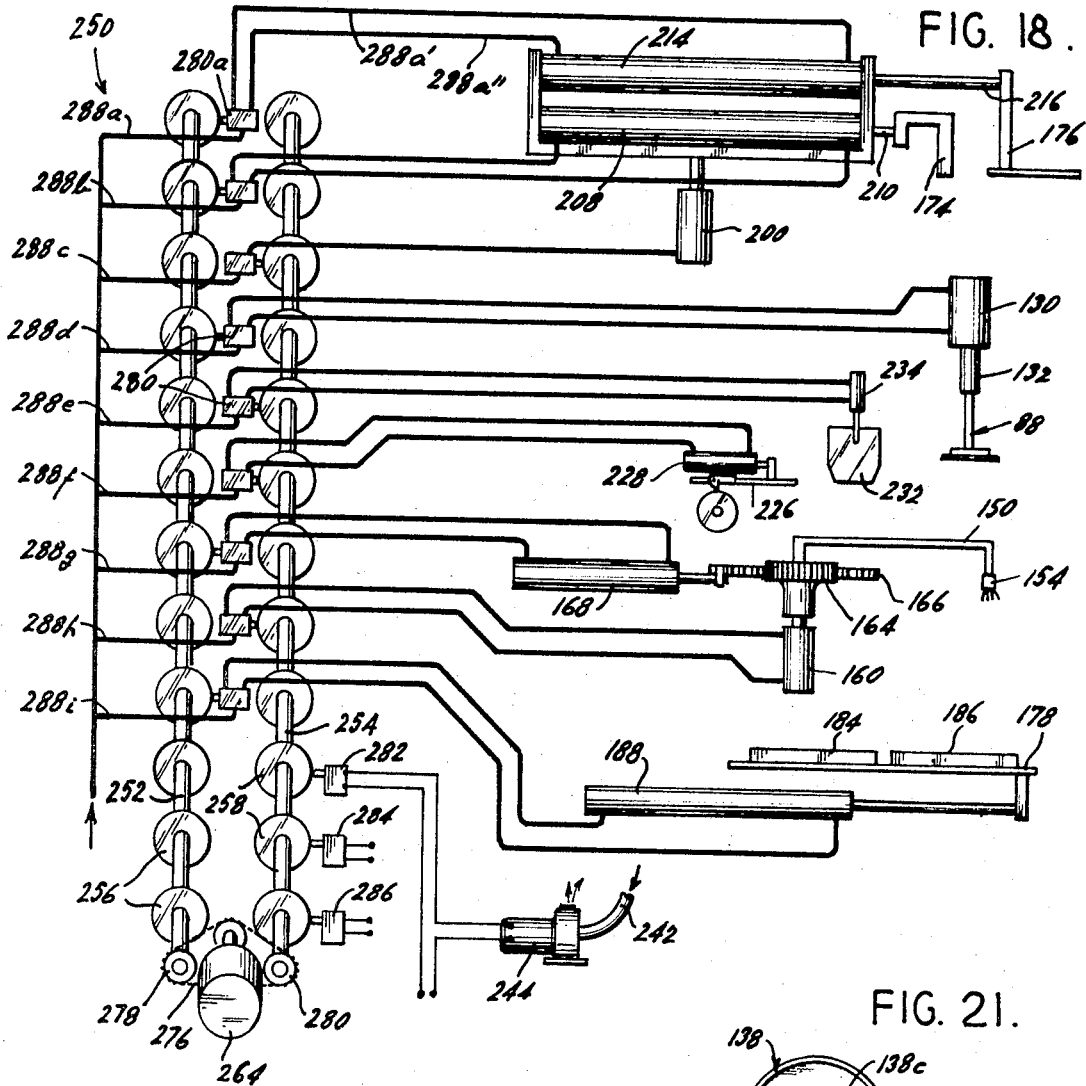
FIG. 18.
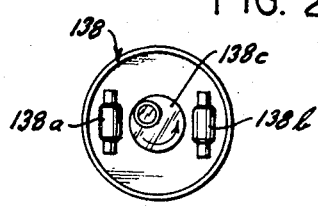
FIG. 21.
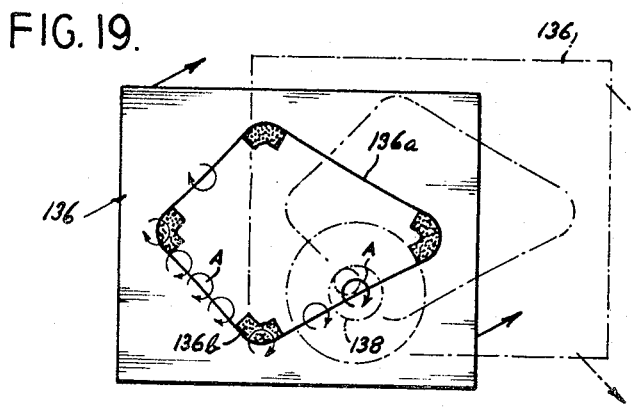
FIG. 19.
FIG. 20.
INVENTORS
JAMES J. BYRNE
FRANCIS O. BLACKWELL III
BY RICHARD J. SHOKITE
Amster & Rothstein
ATTORNEYS

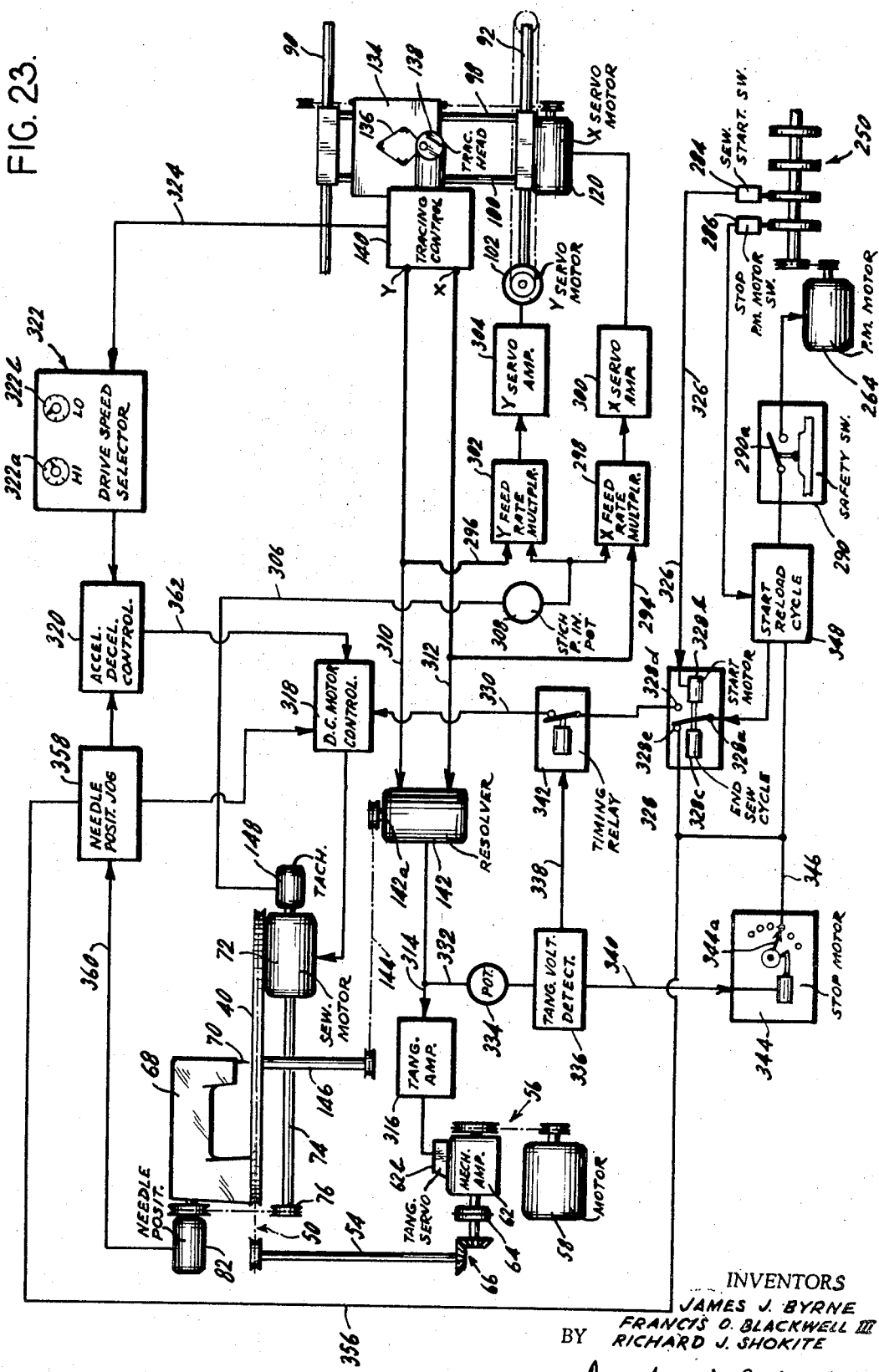

CONTROL FOR SEWING MACHINE

The present invention relates generally to sewing and material-handling systems and, in particular, to an improved sewing machine, method and related apparatus by which one or more plies of material in the flat can be stitched along a predetermined stitch path.

In the garment manufacturing and related industries, there are numerous products which require the stitching of single pieces and multiple ply assemblies of material, either for functional or decorative purposes. Typically, in the manufacture of foundation garments, there is often a need to stitch a decorative or functional overlay to an underlying body panel. Various manual, semi-automatic and totally automatic systems have been suggested for such stitching. Most typical is the manual approach in which a machine operator, utilizing a sewing machine appropriate to the desired stitch configuration, will assemble the one or more material plies and steer the same in relation to the needle of the sewing machine to achieve the desired stitch pattern, with the operator exercising the requisite skill in steering the work and in controlling the speed of the sewing machine to stitch around corners and the like to complete the stitch pattern. This approach requires skilled operators and is relatively costly.

Throughout the years, various semi-automatic and automatic systems have been devised with a view to eliminating the operator function, in whole or in part, with a view to achieving cost reduction and more uniformity and higher quality in the work product. For example, to handle certain types of repetitive operations wherein the same pattern is to be stitched time and again, sewing machines have been developed which operate under cams or similar relatively fixed controls to repetitively reproduce such stitch patterns. However, in view of the lack of versatility of such special purpose equipment, various approaches have been investigated for imparting versatility and flexibility to such automatic stitching equipment to enable the same to be utilized for stitching a variety of patterns. For example, attempts have been made to utilize optical scanning for two coordinate sewing machine controls in that such optical scanning, which can produce signals corresponding to the X and Y functions of a desired stitching pattern by reading a line drawing of the pattern, is inherently very versatile. However, the optical scanning systems which have been proposed for automating sewing machines fall far short of the commercial requirements for this type of equipment and, in particular, do not exhibit the necessary functional characteristics and/or degrees of freedom including, for example and without limitation, the ability to accurately follow a stitch pattern, uniformly stitch, stitch closed patterns (i.e., 360°), and accurately follow a stitch pattern at a corner or a sharp change in the direction of the pattern. Accordingly, in more recent times, there has been a tendency for those attempting to automate stitching operations to move in the direction of employing numerical controls. However, such numerical control systems have severe limitations including relatively high system cost and the need for relatively complicated software for programming the control. Typically, in a numerical control stitching system, it is first necessary to digitize the information for the stitch pattern, prepare a numerical control tape through the use of a computer, and then utilize the tape to control the special purpose sewing machine.

Broadly, it is an object of the present invention to provide an improved sewing machine and method which obviates one or more of the aforesaid difficulties. Specifically, it is within the contemplation of the present invention to provide an automatic stitching machine and method in which the complete machine function may be programmed from a line drawing including such functions as the direction of stitch path, the normal to the stitch path, the approach to corners, the control of speed, acceleration, deceleration, cycle start, cycle stop and the interrelationships between these several functions.

In accordance with the overall method aspects of the present invention, there is provided a technique for stitching single or multiple plies of material along a stitch path which includes the steps of initially orienting the material relative to a stitching tool at a stitching location, moving the material relative to the stitching location in accordance with the X and Y coordinates of the stitching path and simultaneously rotating the stitching tool at the stitching location in accordance with a trignometric (i.e., tangent) function of the corresponding X and Y coordinates of the stitching path. The movement of the material in accordance with the X and Y coordinates of the stitching path steers the work relative to the stitching tool (i.e., the needle) at the stitching location while the rotation of the stitching tool in accordance with the tangent function of the corresponding X and Y coordinates of the stitching path continuously maintains the stitching tool in the appropriate orientation or heading relative to the successive portions of the stitching path.

In accordance with the overall apparatus aspects of the present invention, there is provided a sewing machine which comprises a work-supporting table and stitching mechanisms mounted on the table and including a needle movable through a stitch-forming stroke at a stitch location. Means are provided for mounting the table for rotation about a table axis substantially coaxial with the needle. A work clamp is arranged relative to the table to move work past the stitching location to provide a stitching pattern in the work. Clamp control means are provided for moving the work clamp as a function of the stitching pattern and table control means are provided for rotating the table as a function of the stitching pattern. The clamp control means includes first means for moving the work clamp in accordance with the X coordinate of the stitching pattern and second means for simultaneously moving the work clamp in accordance with the Y coordinate of the stitching pattern such that the clamp moves and continuously orients the work relative to the needle for the desired stitching pattern. Rotation of the table under control of the table control means continuously places the needle in the requisite heading (i.e., tangential) relative to the desired stitch pattern. Advantageously, electro-optical scanning means are provided which read a line drawing corresponding substantially to the desired stitch pattern and provide the requisite control signals related to the X and Y coordinates of the stitching pattern for moving the work and from which the tangent control signal is derived for moving the table and the stitching mechanisms.

In a preferred form of the apparatus, an overhead frame is mounted above the table and provision is made for suspending the work clamp from the overhead frame in the form of first and second sets of ways disposed at right angles to each other. The first set of ways is attached to the overhead frame and the second set of ways is movable on the first set of ways, with the suspending means for the work clamp being operatively connected to the second set of ways. Additionally, the optical scanning head of the electro-optical scanning means is mounted at a stationary location on the overhead frame, while the movable template-supporting platen thereof is operatively connected to and movable with the work clamp. The platen is adapted to receive any one of a number of templates, in the form of line drawings, corresponding to the various stitch patterns to be automatically produced by the present equipment.

In accordanc with still further aspects of the present invention, the machine is constructed with a control which synchronizes the movement of the work (in accordance with the X and Y coordinates of the desired stitch pattern) to the speed of the motor of the stitching mechanisms such that the movement of the work past the stitching location by the work clamp is synchronized to the rate of stitching as established by the speed of the motor of the stitching mechanisms. Advantageously, the sewing machine drive includes a motor and control which provides for a high speed stitching rate and a low speed stitching rate. Means are provided which are responsive to the electro-optical scanning means and the reading of the line drawing for establishing one or the other of the stitching rates and the corresponding synchronous movement of the work past the stitching location. In accordance with this aspect of the invention, by the simple expedient of providing appropriate indicia on the line drawing, it is possible to control the stitching rate and the corresponding movement of the work, for example, for the purpose of stitching along a particular course at a relatively high speed, followed by a reduction in stitching rate at a predetermined point along the stitching course and when approaching a corner at which a comparatively drastic change in the heading of the stitching mechanisms is required to properly orient the stitching mechanisms in relation to a further course of the stitching pattern.

In addition to the foregoing capability of automatically stitching on a programmed basis from a line drawing, the present invention includes a material picking, assembling and transferring device which is coordinated to the automated sewing machine for the purpose of picking and assembling the pieces or plies of work into a stacked assembly and for automatically delivering the stacked assembly to the automated sewing machine for the formation of the desired stitching pattern in such material assembly.

In accordance with this aspect of the invention, there are provided at least first and second work-storing means which are adapted to receive corresponding first and second pieces of work which are to be transferred to an intermediate stacking and orienting station. First transfer means are arranged to pick up the first and second pieces of work and stack the same at the intermediate station, while second transfer means are arranged to move the stack from the intermediate station to the stitching location whereupon programming means in the machine initiates the stitch-forming sequence of the automated sewing machine. Thus, by simply loading the respective work-storing means and placing the machine in operation, the machine automatically picks, stacks, transfers and then stitches in accordance with the stitch pattern programmed by the drawing or indicia associated with the electro-optical scanning means.

The above brief description, as well as further objects, features and advantages of the present invention, will be more fully appreciated by reference to the following detailed description of a presently preferred, but nonetheless illustrative sewing machine and material-handling system embodying features of the present invention, when taken in conjunction with the accompanying drawings, wherein.

Figure 1:
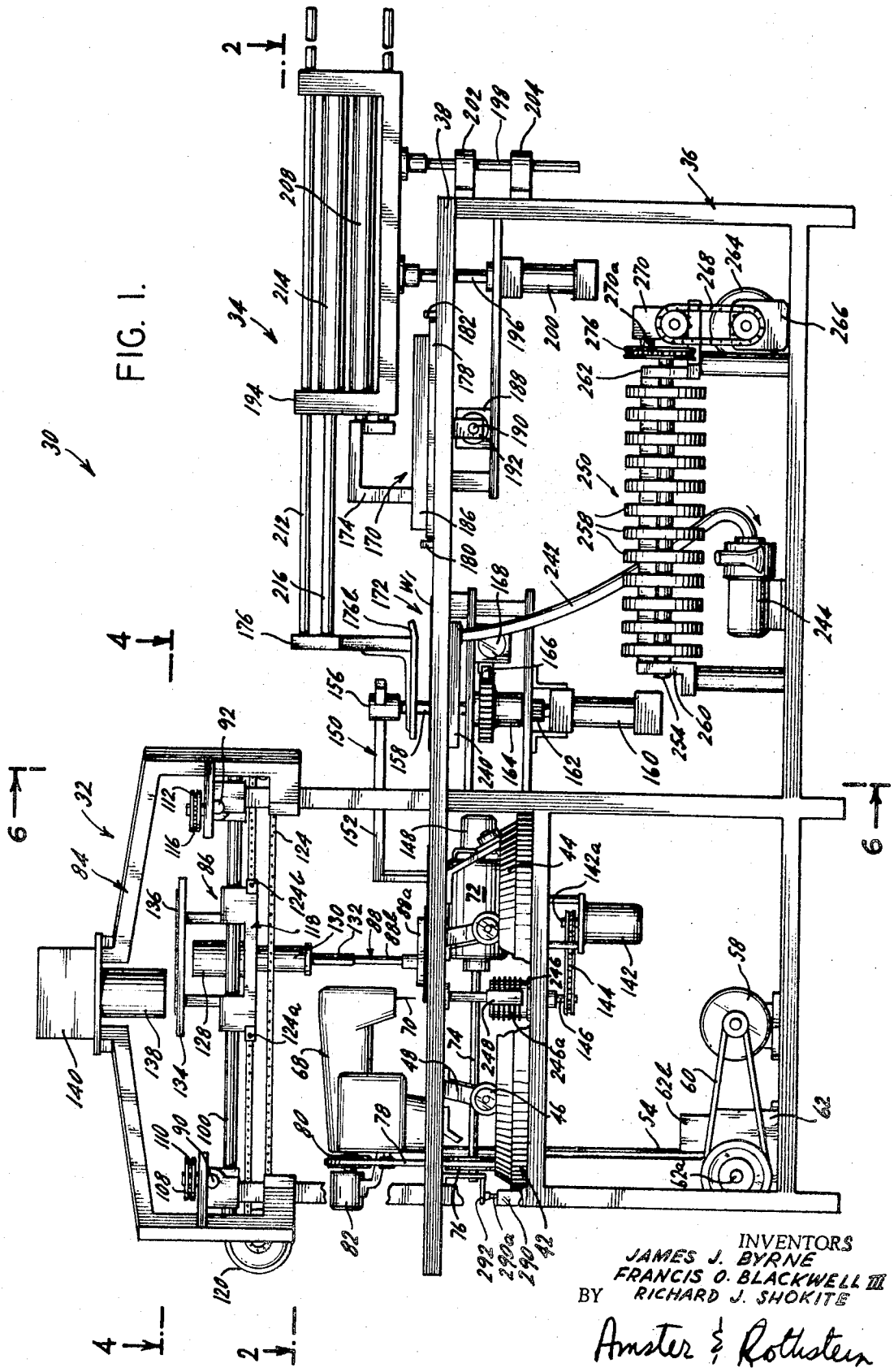
FIG. 1 is a side elevational view of an automated sewing machine and material-handling system embodying features of the present invention.
Figure 4:
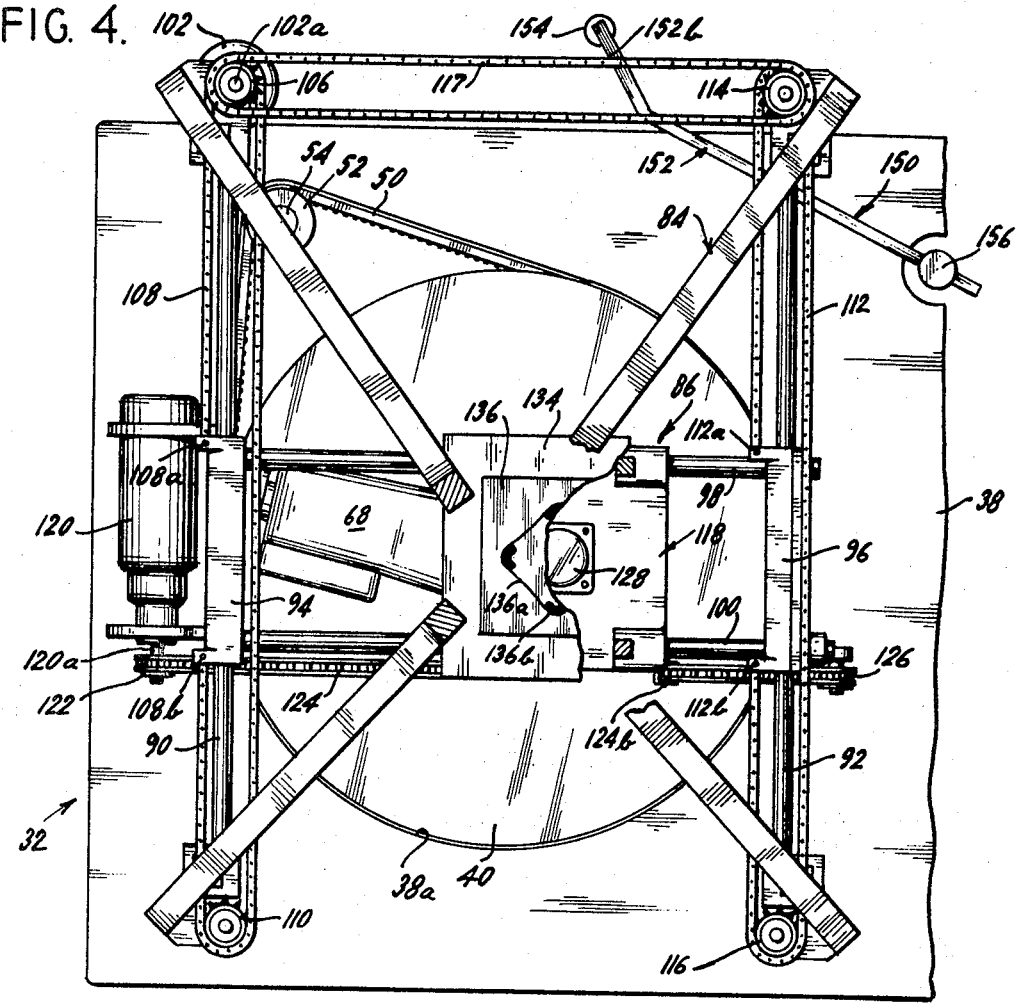
Figure 5:
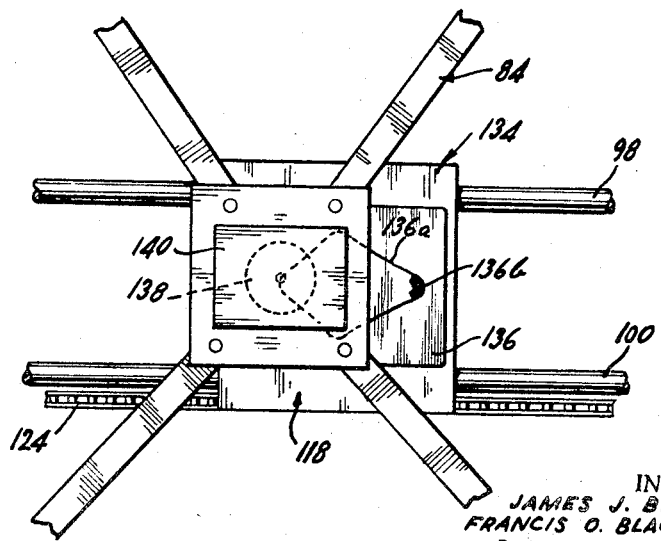
Figure 6:
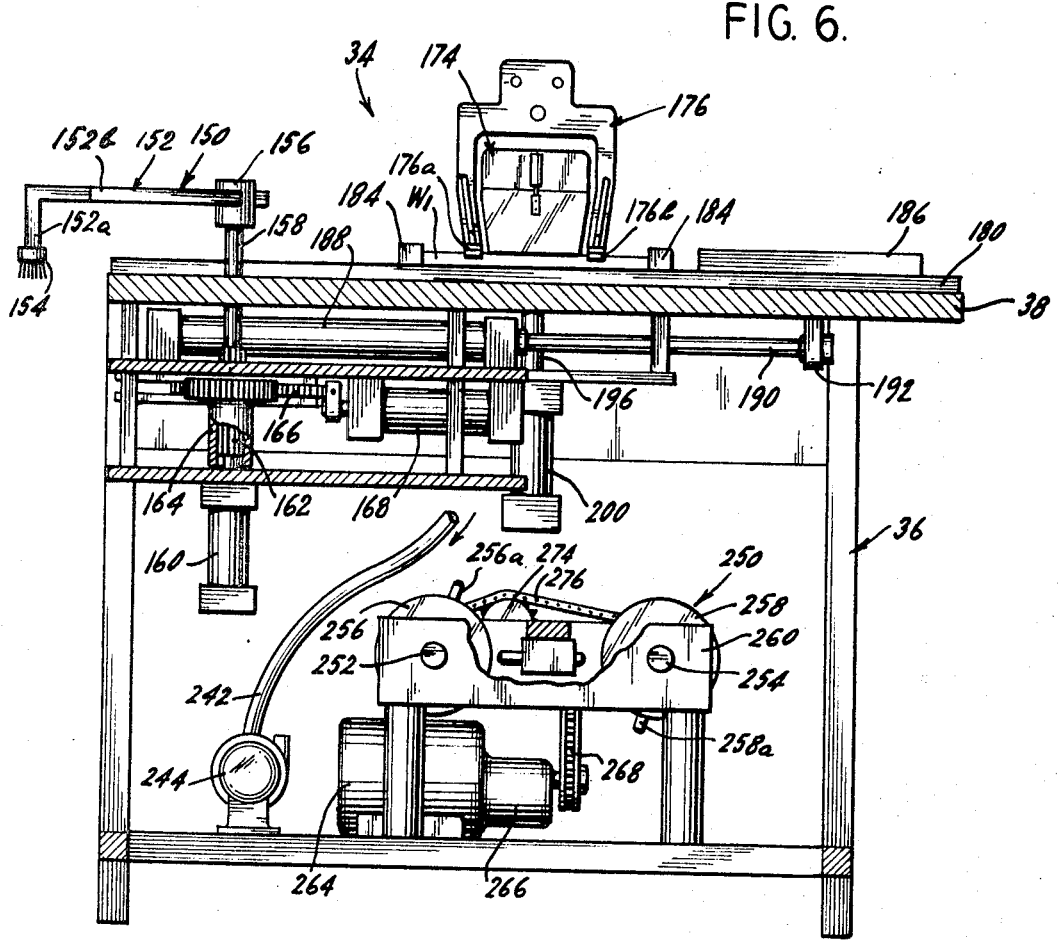
Figure 7:
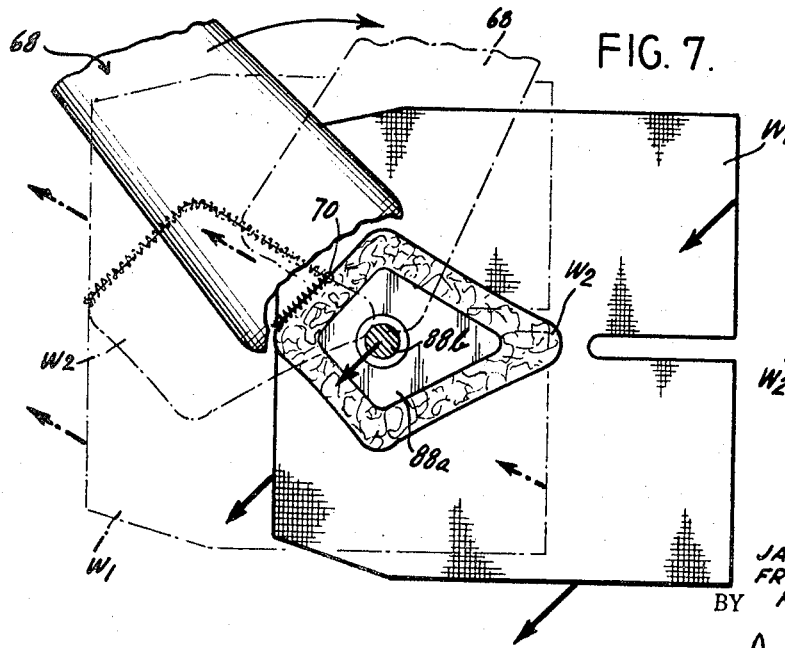
Figure 8:
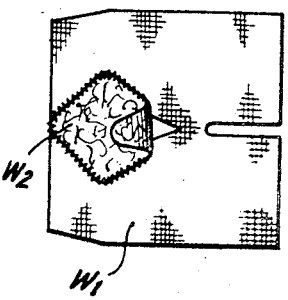
Figure 22:
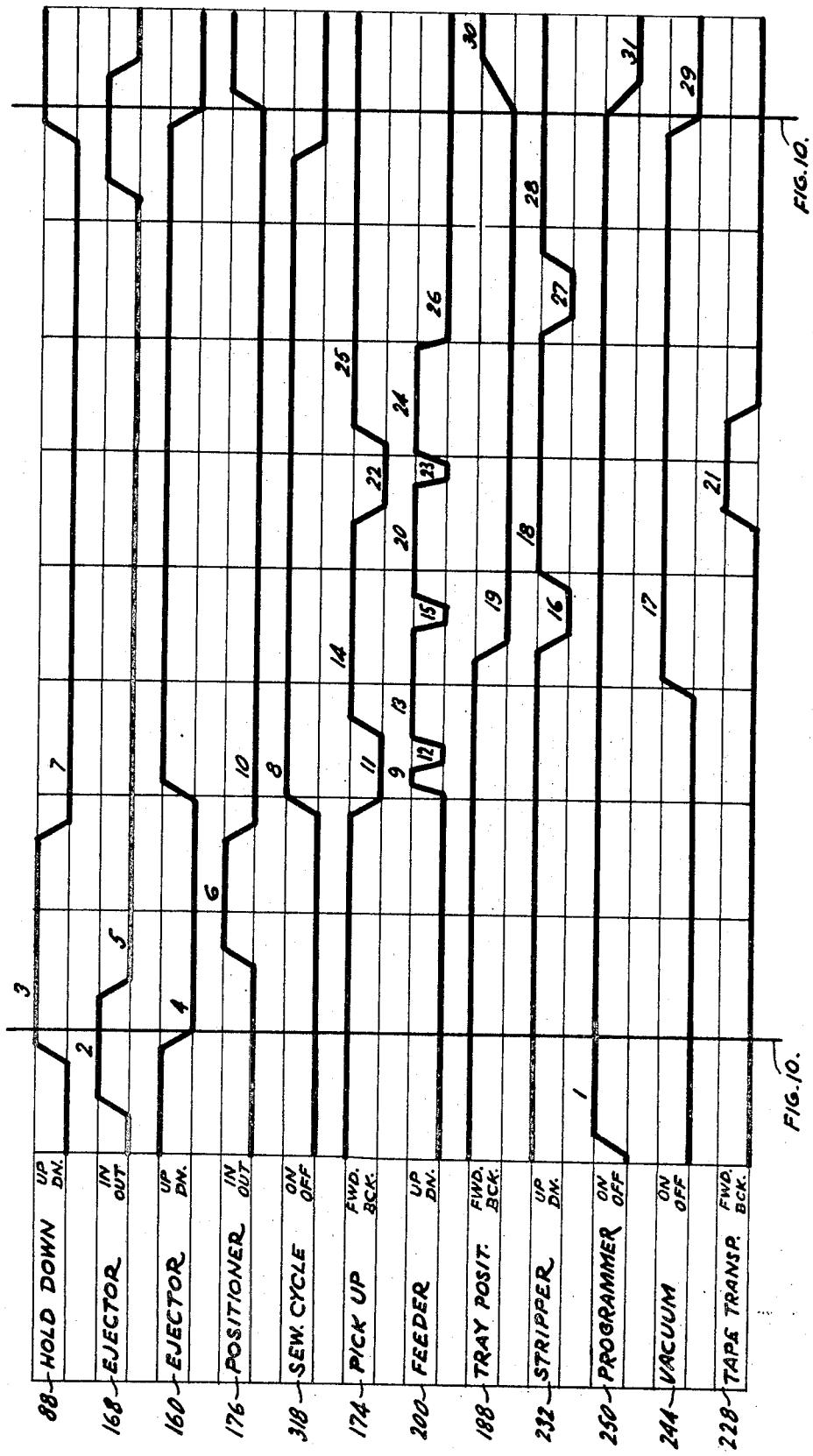

FIG. 4 is a sectional view taken substantially along the line 4—4 of FIG. 1 and looking in the direction of the arrows showing details of the overhead supporting frame and the mechanisms mounted thereon including the X and Y ways or guide rails which support the movable platen associated with the stationary optical scanning head and the work-moving clamp which moves in accordance with the X and Y coordinates of the drawing or indicia supported by the platen and scanned by the stationary scanning head;

FIG. 5 is a fragmentary detail on FIG. 4 looking straight down on the overhead frame and the stationary optical scanning head;

FIG. 6 is a sectional view taken substantially along the line 6—6 of FIG. 1 showing details of the material-handling system and programmer for the machine;

FIG. 7 is a schematic and diagrammatic view showing a typical multiple-ply assembly and its relationship to the head of the sewing machine, with the dotted lines showing a further oriented position of the assembly to the head of the sewing machine;

FIG. 8 is a plan view of a typical two-ply assembly including a body panel and overlay which may be stitched in accordance with the present invention, with part of the stitching removed and a corner of the overlay or upper ply folded back for illustrative purposes;

FIG. 9 is a fragmentary plan view, on an enlarged scale, showing details of the material-handling system and its relationship to the automated sewing machine;

FIG. 10 is a sectional view taken substantially along the line 10—10 in FIG. 9 looking in the direction of the arrows and showing the transfer and positioning head delivering the work to the clamp of the sewing machine;

FIG. 11 is a schematic view corresponding to FIG. 10 and showing the material-handling system at the beginning of a typical sequence of picking multiple plies for stacking and delivery to the sewing machine;

FIG. 12 is a view similar to FIG. 11 showing the materialhandling system in the act of picking a first ply or piece for delivery to an intermediate assembly station;

FIG. 13 is a view similar to FIG. 12 but with the first ply or piece at the intermediate assembly station;

FIG. 14 is a view similar to FIG. 12 but showing the second piece or ply being picked and in position for delivery to the intermediate assembly station;

FIG. 15 is a detailed view, with part broken away, showing the construction of a preferred pickup head of the material-handling system which picks the successive pieces or plies and advances the same into the intermediate assembly station;

FIG. 16 is a sectional view of the pickup head taken substantially along the line 16—16 of FIG. 10;

FIG. 17 is a sectional view of the pickup head taken substantially along the line 17—17 of FIG. 15;

FIG. 18 is a schematic and diagrammatic view of the machine programmer illustrating a number of the functions performed under the control of said programmer;

FIG. 19 is a plan view of the movable platen of the electrooptical scanning system shown with a typical line drawing or master pattern thereon and diagrammatically illustrating the scanning function performed by the scanning head as the platen moves, such movement being indicated by the directional arrows and the dotted line showing;

FIG. 20 is an enlarged view at the corner of a typical pattern control line drawing which when read by the optical scanning system, programs the machine to change the stitching rate and the heading of the stitching mechanisms;

FIG. 21 is a bottom plan view of a conventional optical scanning head showing the rotary scanning system, the lens and the lamps thereof;

FIG. 22 is a diagram illustrating the timing of the coordinated functions of the automated sewing machine and the materialhandling system in one program or stitching cycle; and, FIG. 23 is a schematic and diagrammatic drawing of the machine control, which drawing should be considered in conjunction with the schematic showing of the programmer in FIG. 18.

Referring now specifically to the drawings, there is shown an improved sewing machine and material-handling system in accordance with the present invention which is generally designated by the reference numeral 30 and includes an automated sewing machine 32 and a coordinated material-handling system 34 which is specifically designed for the stitching together of two plies or pieces of material, for example, the body panel W₁ and overlay W₂ shown in FIG. 8. Although the machine will be described in conjunction with this particular application, it will be appreciated that it is perfectly suited for providing decorative or functional stitching in a single piece or ply of material and in more than two plies or pieces of a stacked assembly. Further, the automated electro-optical control is suitable for use in performing work functions other than stitching.

Referring specifically to FIGS. 1 to 6 inclusive, the machine 30 includes an appropriate main machine frame 36 carrying a table top 38 which extends horizontally and is at an appropriate level for convenient access to the several work functions to be performed thereon. Table top 38 is provided in the left half section with a circular cutout 38a in which there is rotatably mounted a work and sewing machine supporting turntable 40 positioned such that the upper face thereof is coplanar with and provides a substantial continuation of table top 38. Turntable 40 is journalled for rotation about a turnable axis by the provision on the frame 36 beneath the turntable 40 of a circular, stationary turntable-supporting track 42 terminating in an inclned rail 44 which supports flanged rollers 46 journalled on depending feet 48 connected to the underside of turntable 40. Thus, turntable 40 is rotatably supported at the appropriate level in relation to table top 38 and is capable of turning about its vertical turntable axis when driven by the machine control.

Turntable 40 is turned about its axis by a rim drive including a driven timing belt 50 (see FIGS. 2 and 3) which is trained about and engages peripheral teeth formed on turntable 40. The timing belt 50 is driven by a drive pulley 52 carried on a vertically extending drive shaft 54 which is appropriately journalled on frame 36, as by one or more bearings 56. As seen best in FIG. 1, drive is imparted to the turntable drive shaft 54 from a turntable servomechanism which includes a drive motor 58 which is coupled by pulleys and belt 60 to the power input shaft 62a of a mechanical amplifier 62 of known construction. The mechanical amplifier 62 may be of the type sold by Seneca Falls Machine Company as described in Technical Bulletin TB-1025 and serves as a high-power actuator which produces idential characteristics of high power output under control of an input device or servo 62b at its power output shaft 62c. The output shaft 62c of the mechanical amplifier 62 is connected via a normally energized slip clutch 64 to bevel gearing 66 which in turn is connected to the lower end of drive shaft 54. The incorporation of slip clutch 64 in the turntable servo mechanism is a safety precaution and avoids a sudden jolt in the turntable drive when the control deactivates and the machine and slippage in the system to protect the mechanisms during normal machine function. The function of the servo mechanism associated with the turntable 40 will be more fully described in conjunction with the description of the overall control in conjunction with FIG. 23.

Fixed to and rotatable with the turntable 40 is the sewing machine 68 which is selected to make the desired stitch and may be of any one of a number of different types, such as a conventional lock stitch sewing machine or the illustrated zig-zag machine (see FIGS. 7 and 8). The sewing machine 68 is oriented such that the needle 70 thereof moves through a stitch-forming stroke which is substantially coaxial with the turntable axis, with the turntable 40 and the sewing machine 68 turning in unison on the common turntable and needle axes. Drive is imparted to the sewing machine 68 from a sewing machine motor 72 (see FIG. 1) which is mounted beneath turntable 40 and is coupled via drive shaft 74 to drive pulley 76 (see FIG. 3) and via belt 78 to the driven pulley 80 on the main shaft of the sewing machine 68. The sewing machine 68 has appropriate attachments for supplementing the stitching function including needle positioner 82 on its main shaft and a thread clipper (not shown). As is generally understood, the needle positioner 82 can be arranged to sense when the needle 70 is in its upper or clearance position and can be employed to actuate the thread clipper whereupon the completed and stitched work assembly may be withdrawn from the machine. The coordination of the sewing machine and its related controls into the overall machine operation will be more fully described hereinafter.

Positioned over the sewing machine 68 and the turntable 40 is an overhead frame 84 which is mounted on the main machine frame 36. The overhead frame 84 carries the work-clamp suspension system 86 from which the work clamp 88 is suspended for movement in accordance with the X and Y coordinates of the desired stitch pattern. Specifically the work clamp suspension system 86 includes parallel Y ways or guide rails 90, 92 (see FIG. 4) which extend fore and aft of the machine and are appropriately fixed to the overhead frame 84. Slidably mounted on the Y ways or guide rails 90, 92 are X way or guide rail end carriers 94, 96 which in turn carry the spaced and parallel X ways or guide rails 98, 100. Extending adjacent the aft end of the Y way 90 and mounted on the overhead frame 84 is the Y axis servo motor 102 which carries on its output shaft 102a a driving end sprocket 104 and a coordinating sprocket 106. Trained about the driving end sprocket 104 is a chain 108 which is connected at end 108a to the adjacent end of the carrier 94. Chain 108 is also trained about idler end sprocket 110 journalled adjacent the fore end of the Y way 90 and has its other end 108b connected to the adjacent end of carrier 94. In similar fashion, chain 112 is provided which is trained about end sprockets 114, 116 and connected at its opposite ends 112a, 112b to the opposite ends of carrier 96. Chain 112 is driven in unison with chain 108 by the provision of coupling chain 117 which is trained about coordinating sprocket 106 and end sprocket 114. Thus, in response to Y coordinate control signals to the Y axis servo motor 102, carriers 94, 96 and X ways 98, 100 are moved in the Y direction.

Figure 3:
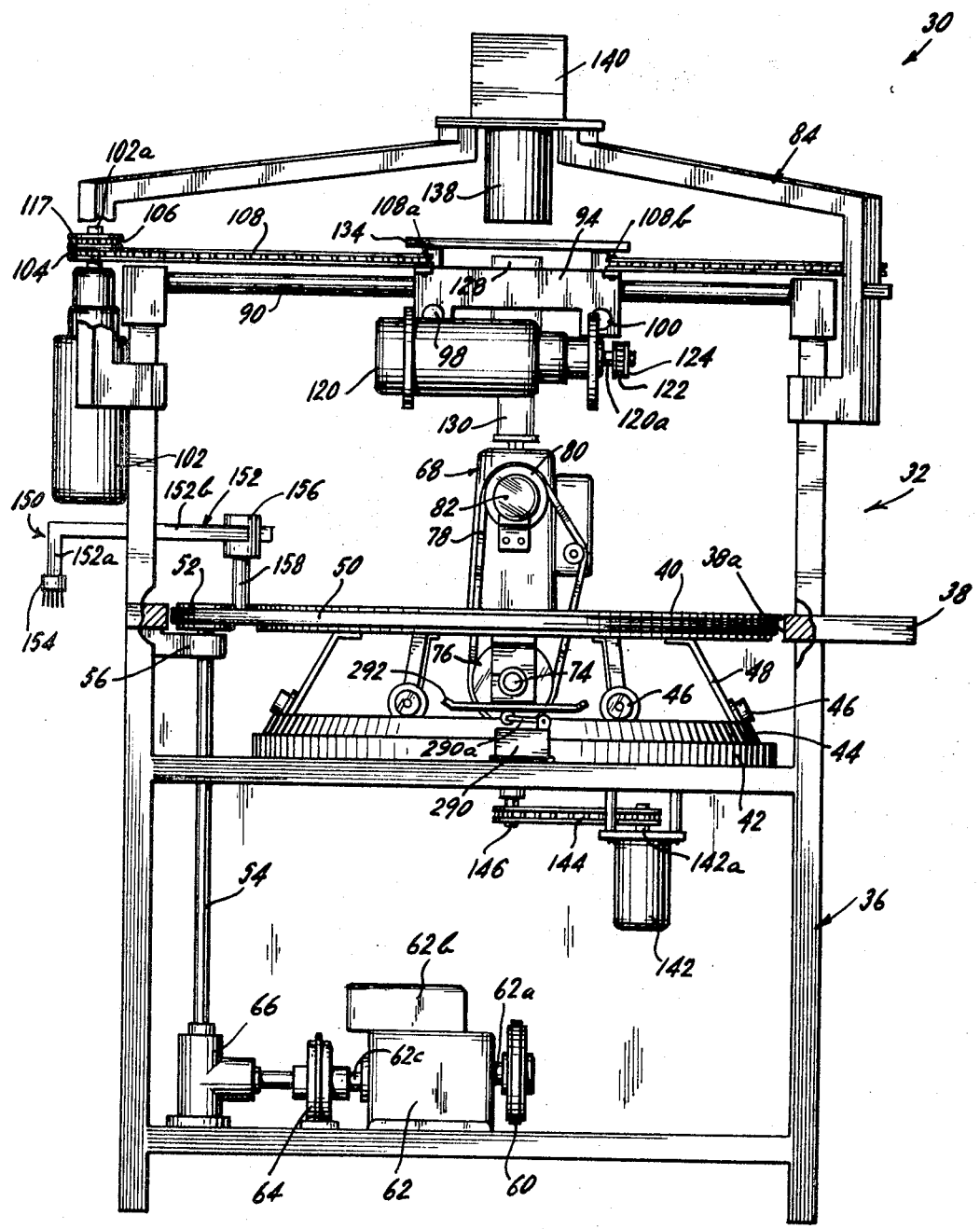
FIG. 3 is an elevational view of the machine taken from the left of FIGS. 1 and 2.

Slidably mounted on the X ways 98, 100 is a clamp and platen carrier 118 which is driven from side to side on the X ways 98, 100 from the X axis servo motor 120 which in turn is mounted on X way end carrier 94 by appropriate bracketing (see FIG. 3). The output shaft 120a of the X axis servo motor 120 carries a driving sprocket 122 about which is trained a driving chain 124 which has one end 124a connected to one end of the platen and clamp carrier 118 and the other end trained about end sprocket 126 and connected at 124b to the other end of carrier 118. Thus, in response to X coordinate control signals to the X axis servo motor 120, the carrier 118 is driven to the left and right along the X axis of the work clamp suspension system 86.

The clamp 88 is suspended from carrier 118 such that it may be raised and lowered between clearance and clamping positions relative to turntable 40. To this end, and as seen in FIG. 1, a double-acting air cylinder 128 is fixed to carrier 118 extending thereabove and carrying a depending guide sleeve 130 which provides a non-rotatable but slidably mounted suspending rod 132 which is connected to the piston of air cylinder 128. Suspending rod 132 in turn carries the mounting leg 88b of clamp 88 which terminates in clamp shoe 88a. Thus, by the selective admission of air to the cylinder 128, the clamp 88 may be raised to permit the work to be inserted therebeneath, lowered to move the work relative to the needle 70 and then raised to permit the work to be removed from the machine.

Carrier 118 also supports the platen 134 which moves in unison with the clamp 88 in accordance with the X and Y coordinate signals. Movable platen 134 has attached thereto a template or line drawing 136 which is provided with the pattern shape and other indicia for controlling the machine. Positioned above the movable platen 134 and mounted in a stationary position on overhead frame 84 coaxial with the needle and turntable axes is the electro-optical or phototrace scanning head 138 and its related phototrace controller or circuitry 140 which contains the electronics for generating the analog feed rate signals. Since this two axis electro-optical scanning system 138, 140 is a commercially available unit, a complete description of the same is dispensed with in the interest of brevity and it will suffice to point out that it is commercially available from the Controls/Systems Division of Seneca Falls Machine Company, Seneca Falls, N.Y., is known as the SFM Optronic Tracer System and is fully described in the corresponding operation and service manual put out by that company. In general, such two axis system has the ability to sense the edge of a line, or the edge of a black-on-white silhouette drawing and provide two electrical signals which direct the servo drives of a 360° tracer to continuously follow the edge of such drawing. Typically, the system contains its own means of illuminating the scanning area and provides continuous analog voltages for related servo drives. For example, as seen in FIG. 21, the scanning head 138 includes illuminating bulbs 138a, 138b for the scanning area A thereunderneath and a rotating lens assembly 138c which is aimed at the scanning area A of the line drawing or template 136. Further description of the electrooptical scanning system 138, 140 is unnecessary, except insofar as the foregoing will be amplified in conjunction with FIG. 23.

In order to track the rotational position of turntable 40, there is suspended on main frame 36 beneath the turntable a resolver 142 (see FIG. 1) which is of known construction and measures tangent error. Resolver 142 generates a tangent error signal which in turn is used via motor 58 to rotate turntable 40 to change its rotational position. Resolver 142 is synchronized to the rotational position of turntable 40 by coupling resolver input shaft 142a via timing belt 144 to a depending turntable shaft 146 coaxially of and fixed to turntable 40. Further description of the resolver 142 and its function will be found in conjunction with the description of the overall control and FIG. 23.

Further, a tachometer 148 is connected to the drive shaft 74 of the sewing machine motor 72 to provide a means for coordinating and synchronizing the feed rates of the X and Y servo motors 120, 102 for the work clamp 88 to the stitching rate of the sewing machine 68.

Provision is made for removing the finished stitched work from beneath the shoe 88a of work clamp 88 at the end of a sewing machine cycle. In this embodiment, there is provided an ejecting mechanism, generally designated by the reference numeral 150 and seen best in FIGS. 1-3, which is raised and lowered and moved between the work pick-up position (shown by dotted lines in FIG. 2) to the work drop-off position (shown by the full lines in FIG. 2). Specifically, the ejecting mechanism 150 includes an L-shaped supporting arm 152 which carries at the depending end of its short leg 152a a work-engaging brush head 154. The long leg 152b of arm 152 is adjustably connected to a coupling head 156 on the upper end of vertical actuating shaft 158. The actuating shaft 158 moves up and down to raise and lower the work-engaging head 154 and turns about its axis to swing the work-engaging head 154 between the full and dotted line positions shown in FIG. 2. The actuating shaft 158 is connected at its lower end to the piston of an air cylinder 160 which serves to raise and lower arm 152 and head 154. The air cylinder 160 is appropriately suspended on the main machine frame 36, as seen best in FIG. 1. Additionally, actuating shaft 158 has a spline connection 162 to rocker pinion 164 which is journalled on the main frame 36 about shaft 158. The rocker pinion 164 is engaged by rack 166 driven from the piston of air cylinder 168 which is operable to rock the arm 150 and head 154 between the full and broken line positions of FIG. 2. Thus, by the appropriate programmed activation of the air cylinders 160, 168 (as will be described in conjunction with FIG. 18), the brush head 154 while in a raised position may be swung from the full line position shown in FIG. 2 (as indicated by the directional arrow) to the dotted line position overlying the work and lowered into contact with the work; and when lowered to the work-contacting position swung to the drop-off position off the table to clear the finished work, for example, into a storage bin or onto a takeaway conveyor.

Figure 2:
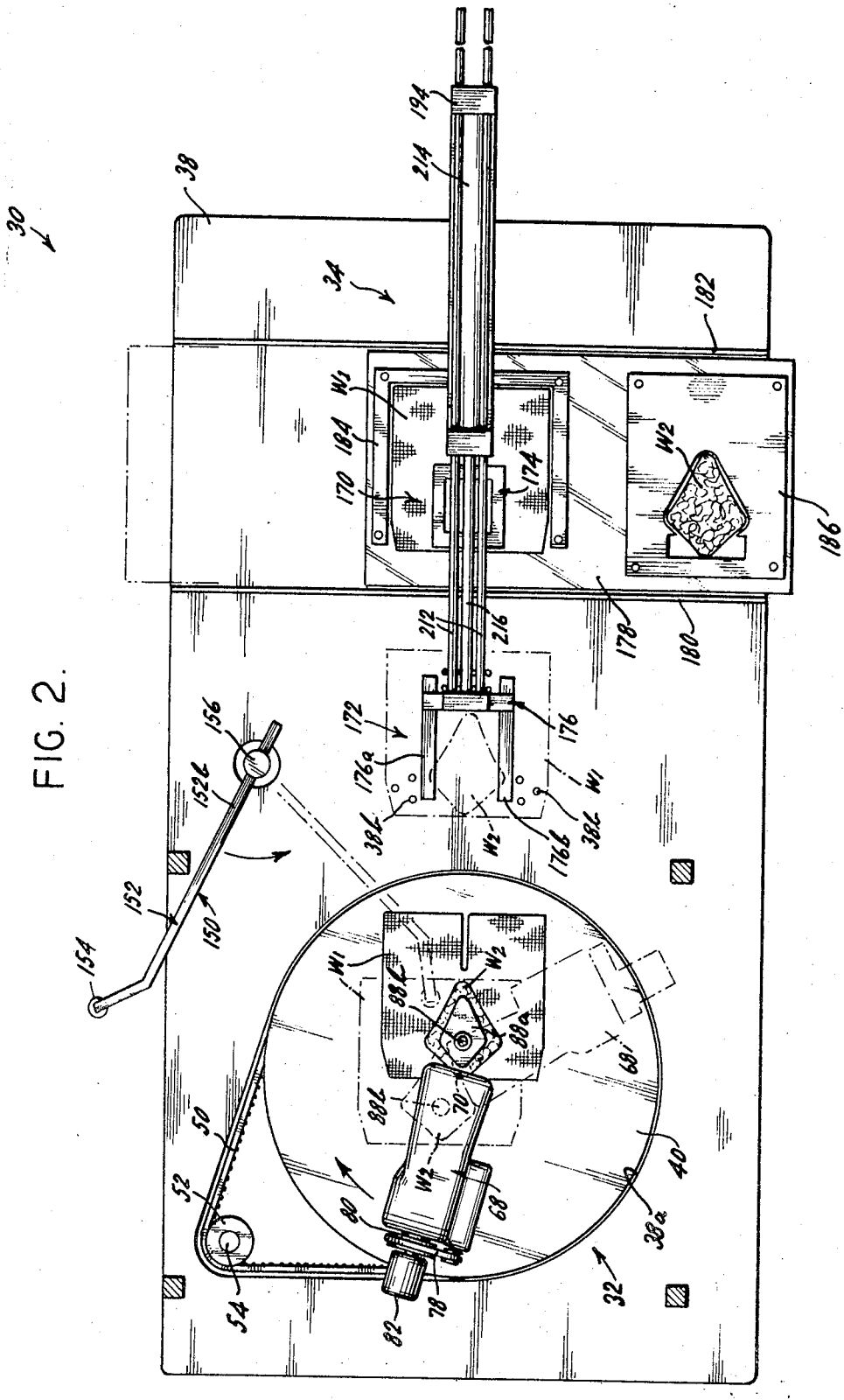
FIG. 2 is a plan view of the machine taken along the lines 2—2 of FIG. 1 and looking in the direction of the arrows.

Reference will now be made to FIGS. 1, 2 and 9–17 for a description of the work picking, assembling and transferring mechanisms 34 which pick up the multiple plies of the work at a pickup station 170 and assemble and stack the multiple plies at an intermediate assembly station 172. Basically, the mechanisms 34 include a work pickup head 174 which moves between the pickup station 170 and the assembly station 172 to bring one or more plies into the assembly station 172; and the transfer and positioning head 176 which moves between the assembly station 172 and a work position beneath work clamp 88 in the automated sewing machine 32 for delivering the one or more plies to the requisite oriented position beneath the work clamp 88 for the programmed stitching function. As best seen in FIG. 2, the material-handling system 34 includes a laterally shiftable tray carrier 178 which is mounted on the table top 38 between laterally extending guide tracks 180, 182. In this illustrative embodiment, the laterally shiftable carrier 178 supports a first tray 184 and a second tray 186. However, the system 34 is suited to pick more than two pieces of work and can be readily modified to include additional work-supporting trays or bins. For this specific application, the first tray 184 is shaped to support a stack or bundle of the first work piece $W_1$, which in this illustrative embodiment is the body panel of a foundation garment. The second tray 186 is arranged to support a stack or bundle of the second work piece $W_2$, which in this illustrative embodiment is decorative and reinforcing overlays to be stitched to the body panel in a prescribed orientation relative thereto (see FIG. 8). In the full line position of FIG. 2, shiftable tray or bin carrier 178 is disposed with the first tray 184 in the pickup station 170 relative to head 174; and in the dotted line position, the shiftable carrier 178 is disposed with the second tray 186 at the pickup station 170 relative to head 174. As seen best in FIGS. 6 and 10, the lateral shifting of carrier 178 is accomplished by a double-acting air cylinder 188 which is mounted beneath the table top 38 (see FIG. 6) on main frame 36, with the piston rod 190 being connected by coupling head 192 through table cutout 38a (see FIG. 10) to the shiftable carrier 178. Thus, upon selective actuation of the double-acting air cylinder 188, as will be described in conjunction with FIG. 18, the first and second trays 184, 186 may be brought to the pickup station 170 relative to head 174.

As will be appreciated by considering the duty sequence for heads 174, 176, such heads must be both raised and lowered relative to the work and moved longitudinally of the machine. Pickup head 174 is lowered at the pickup station 170, raised to pick the topmost piece of work from one or the other of the stacks, moved to a drop-off location at the intermediate assembly station 172, lowered at the intermediate assembly station to drop the work off and raised and returned to the pickup station 170 to pick up the next piece of work. Similarly, transfer head 176 must be lowered at the intermediate assembly station 172 to engage the oriented material assembly, moved while in the lowered position to slide the work beneath the clamp shoe 88a of the work clamp 88 and then raised and returned to the intermediate assembly station 172 for the next transfer sequence. To this end, there is mounted on tabletop 38 a vertically movable cradle 194 which is supported on depending mounting shaft 196 and guide rod 198. Mounting shaft 196 is connected to the piston of a single acting air cylinder 200. The cradle 194 is guided for such up and down movement by appropriate bearings 202, 204 for guide rod 198. Cradle 194 is driven upwardly by air cylinder 200 and returns to the lower position by its own weight when cylinder 200 is ported to atmosphere. The timing and functions performed by heads 174, 176 is such that the common raising and lowering of cradle 194 will achieve the respective work functions in the desired timed relationship. Pickup head 174 is guided for its longitudinal movement by two stabilizing rods 206 which are connected at their leading ends to head 174 and are guided intermediate their lengths on the cradle 194. Head 174 receives its longitudinal movement between the pickup station 170 and the intermediate assembly station 172 by the provision of air cylinder 208 and piston rod 210. Similarly, head 176 is supported by stabilizing rods 212 and is actuated by air cylinder 214 and piston rod 216.

The details of pickup head 174 are best seen in FIGS. 15–17 inclusive. Basically, the head 174 includes a work-contacting face established by a plurality of tape guide rollers 218 about which are trained the pressure sensitive tape 220 which emanates from the supply roll 220a on supply shaft 222 and is taken up on a takeup roll 220b on takeup shaft 224. The tape 220, which has its pressure sensitive side facing downwardly, is indexed from the supply roll 220a to the takeup roll 220b by a pawl and ratchet actuating mechanism 226 which includes actuating rod 226a and driving pawl 226b driving ratchet 226c on takeup shaft 224. The pawl-actuating mechanism 226 is completed by the provision of a spring-biased pivoted holding pawl 226d which engages driving ratchet 226c and a holding pawl 226e on rod 226a which engages ratchet 226f on a supply shaft 222. The pawl and ratchet mechanism 226 is driven from an air cylinder 228 and piston rod 230 mounted within the head and actuated as will be described in conjunction with FIG. 18. The head 174 further includes a stripper plate 232 which is vertically movable and includes stripper feet 232a, 232b which move relative to the work-contacting face established by the pressure sensitive tape 220 (see the full and broken lines shown in FIG. 17) under control of the stripper cylinder 234 and piston rod 236, as will be described in conjunction with FIG. 18. Essentially, cylinder and piston rod 228, 230 operate at a rate to periodically replenish the pressure sensitive tape 220 to insure the pickup function, while stripper cylinder and piston 234, 236 operate at the requisite time in the cycle to strip the picked-up work from the head 174 at the intermediate assembly station 172.

The transfer and positioning head 176 is simply in the form of a two-runner sled 176a, 176b (see FIG. 2), with the sled runners 176a and 176b being spaced to contact the several plies yet provide adequate clearance therebetween for engagement of the work beneath the shoe 88a of the work clamp 88 at the stitching station. The underside of sled runners 176a and 176b may be provided with elastomeric paddings, as of foam rubber, while the top face of table 38 and the top face of the turntable 40 are initially constructed to be rather smooth and slick such that the work may be readily moved into the stitching position by the transfer and positioning head 176.

At the intermediate assembly station 172, there is provided a vacuum clamp 88 for the assembled work which includes housing 240 defining a plenum communicating with holddown ports 38b formed in table top 38. The plenum 240 is connected over vacuum line 242 to an appropriate vacuum pump 244 (see FIG. 10).

Since the sewing machine 68, the needle positioner 82 and related thread clippers, etc. are rotating with the turntable 40, provision must be made for making the requisite electrical connections thereto. As seen in FIG. 1, the machine frame 36 carries a stationary cylindrical commutator 246 having a plurality of slip rings 246a which is arranged coaxially of the turntable 44. Depending from the turntable 40 at a radial location off axis is a contact member 248 carrying plural brushes engaging slip rings 246a. The brushes are connected via appropriate wiring (not shown) to the sewing motor 72, etc. as is generally understood.

As seen best in FIGS. 1 and 6 and as shown diagrammatically in FIG. 18, the machine includes a cam programmer, generally designated by the reference numeral 250, which includes two parallel cam shafts 252, 254 having respective banks of cams 256, 258. The cam shafts 252, 254 are journalled on the machine frame 36 in any appropriate fashion, as by bearings 260, 262 and are driven from a programming motor 264 which has its output shaft connected by gearing 266 and chain 268 to a reduction gear unit 270. The output shaft 270a of unit 270 is coupled via drive sprocket 274 and drive chain 276 to driven sprockets 278, 280 on cam shafts 252, 254. The banks of cams 256, 258 are provided with appropriate actuating pines (i.e., pins 256a, 258a in FIG. 6) which actuate a series of air control valves 280 which selectively port the several air cylinders necessary for the timed operation of the machine. Additionally, certain of the cams of the programmer 250 (i.e., the first three cams of bank 258 on cam shaft 254) have associated therewith microswitches 282, 284, 286 for initiating certain of the electrical functions required in the overall control. Specifically, microswitch 282 actuates blower motor 244, microswitch 284 initiates the sewing cycle, and microswitch 286 stops the programmer motor 264 at the end of a machine cycle.

By reference to FIGS. 18 and 22, the functions of the series of cam controlled air valves 280 will be readily understood. These air valves 280 are conventional two-way valves which receive an air supply over main air line 288 and corresponding branch lines 288a through 288i. The outlet ports of the several valves are connected to and selectively actuate the several air cylinders. For example, the outlet ports of vlave 280a associated with air cylinder 214 for the transfer and positioning head 176 are connected over the appropriate air lines 288a', 288a'' to the opposite ends of the double-acting air cylinder 214. Accordingly, at the appropriate time in the machine cycle, as determined by the position of the actuator pins in the corresponding cam 256, air is admitted to one of either of the ends of double-acting air cylinder 214. In the interest of brevity and in view of the timing diagram of FIG. 22, the interrelationship of the functions performed by the programmer 250 will not be further described.

As seen in FIG. 3 and as shown diagrammatically in FIG. 23, a safety switch 290 is mounted on the machine frame beneath the turntable, with the switch actuator 290a in position to be engaged by a holddown plate 292 on turntable 40. The holddown plate 292 is arranged to open switch 290 when the turntable is in its cyclestarting position to disable the programmer 250 for a short interval of time.

Reference will now be made to FIG. 23 for a description of the overall machine control which includes the programmer 250 shown in FIG. 18. In FIG. 23, the various essential components of the machine are shown in diagrammatic form to facilitate an understanding of the function of the control and its relation to the automated stitching mechanisms. As previously explained, the control includes a two-axis electro-optical scanning system including a photoelectric scanning head 138 and its related tracing control or circuitry 140 which derives X and Y signals from the black-on-white silhouette drawing or template 136. The line drawing or pattern includes relatively thin line portions (i.e., portions 136a in FIGS. 19 and 20) which are scanned to provide the X and Y signals indicative of the general shape of the pattern and accentuated areas (i.e., area 136b in FIGS. 19 and 20) for achieving additional control functions including the start of the slow speed cycle during traverse, stopping certain machine functions during the cycle and signalling the end of a stitching cycle. Advantageously, in this system, the scanning head 138 does not move relative to the line drawing or template 136. Rather, the line drawing 136 is on platen 134 which moves in unison with the work clamp 88 such that the analog signals derived from the electro-optical scanning system 138, 140 serves to move both the platen 134 and the line drawing 136 to derive additional information for the several control functions and also to concurrently move the work through the clamp 88.

The tracing control 140 provides an X coordinate output signal on line 294 and a Y coordinate output signal on line 296, which serve as respective inputs to the X and Y continuous AC servo motors 120, 102. As is generally understood by those skilled in the art, if incremental feed is desired rather than continuous feed, the X and Y servo motors 120, 102 could be replaced by stepping motors.

The X coordinate output signal on line 294 is fed to the X servo motor 120 through an X feed rate multiplier (e.g., a magnetic amplifier) 298 and an X servo amplifier 300. Similarly, the Y coordinate output signal on line 296 is fed to the Y servo motor 102 through the Y rate feed multiplier (e.g., a magnetic amplifier) 302 and the Y servo amplifier 304. The feed rate multipliers 298, 302 serve to synchronize the X coordinate and Y coordinate servo motors 120, 102 to the speed of the sewing machine motor 72 such that the movement of the work past the stitching location by the work clamp 88 is synchronized to the rate of stitching as established by the speed of the motor 72 of the sewing machine 68. To this end, the amplifiers or multipliers 298, 302 receive input signals over line 306 from the tachometer 148 on the output shaft 74 of the sewing machine motor 72. A potentiometer 308 is provided in this circuit which may be adjusted to enable the machine operator to accurately control the stitches per inch produced by the automated stitching ystem. This arrangement provides a convenient and reliable means for coordinating the feed rate of the X and Y servo motors 120, 102 to the speed of the sewing machine. It will be appreciated that the illustrative sewing machine, which is of the zig-zag type, has its feed dogs removed such that the movement of the work past the needle 70 is determined by the vector resolution of the X and Y drives to the work clamp 88. Thus, the number of stitches per inch may be established by the adjustment of potentiometer 308; and the selected stitches per inch are held constant at different rates of tracing synchronized to the sewing machine speed. This arrangement is to be contrasted to a normal sewing machine wherein the stitches per inch remain constant when set in motion in that the normal feed dogs are moved through their respective feeding paths at a rate determined by the speed of the sewing machine motor. Thus, as contrasted to a conventional sewing machine and typical two-axis automated control therefor, the utilization of the tachometer 148 and the feed rate amplifiers or multipliers 298, 302, deriving input from both the tracing control 140 and the tachometer 148, provides a control in the signal inputs to the respective servo motors 120, 102 to assure that there will be a constant number of stitches per inch as the work moves under control of the work clamp 88. However, in a system wherein the sewing machine and tracing speeds are constant (rather than providing for variable sewing machine speed and corresponding synchronous variation of tracing speed), the synchronization link described is not required.

As is generally understood, with a sewing machine controlled by an operator, the rotational attitude of the work in relation to the needle of the sewing machine is established by hand such that the sewing machine is at heading approximately at right angles to the stitching path. Stated somewhat differently, it is preferable that the attitude of the sewing machine remain constant in relation to the tangent of the stitch line, namely, with the longitudinal axis of the sewing machine at right angles to the tangent of the stitch line. To this end, the X and Y coordinate output signals from tracing controller 140 are fed as input signals over lines 310, 312 to the resolver 142 which tracks the rotational position of turntable 40. The resolver 142, which is of conventional construction and is commercially available, takes the input signals over lines 310, 312 and the tracking information derived from the turntable 40 and generates a tangent error signal available at output line 314 which provides an input signal to the servo mechanism associated with the turntable 40 to continuously orient the turntable as a function of the tangent of the X and Y coordinating signals derived from the electro-optical scanning system 138, 140. Resolver 142 is continuously oriented to null and provides the requisite tangent error signals to continously re-establish the correct tangent error position for the sewing machine 68 relative to the instantaneous stitch path as sensed by the tracing unit. Specifically, the tangent error signal on line 314 is fed to tangent signal amplifier 316 which feeds its output to the tangent servo 62b of the mechanical amplifier 62 which functions as previously described.

In this illustrative embodiment which includes a multispeed sewing machine drive, the sewing machine motor 72 is energized from an appropriate alternating current source which is connected to the direct current motor controller 318 of conventional construction and available from a number of sources including Graham Transmission (Model C D.C. Drive). The controls associated with the DC motor controller 318 include an accelerator-decelerator control 320 and a drive speed selector 322 connected over line 324 to the tracing control 140 of the electro-optical scanning system 138, 140. The drive speed selector incorporates potentiometers 322a, 322b for adjusting the high and low speed modes of the DC motor controller. As is generally understood, the signals provided over lines 324 to drive speed selector 322 provides information thereto under control of the pattern being traced to switch from high speed operation to low speed operation, or vice versa. The high and low speed control signals are derived by controlling the line width of the pattern 136, with the narrower line signalling operation at high speed and the wider line signalling operation at low speed. Thus, the operator, by the simple expedient of adjusting the high speed potentiometer 322a and the low speed potentiometer 322b, and implementing the requisite program on the line drawings 136, can stitch along predetermined courses at a high speed and, when appropriate (i.e., the approach of a corner), can input the necessary information to the drive speed selector 322 and the DC motor controller 318 to stitch at a slow speed.

As previously described, the timing for the machine is derived from the programmer 250 which includes the programmer motor 264 and the bank of programming cams which control, among other elements, the sewing start switch 284 and the programmer motor stop switch 286. Start switch 284 is connected over leads 326 to main control switch 328 which includes contact 328a, relay or solenoid control coils 328b, 328c and contacts 328d, 328e. In response to energizing relay or solenoid coil 328b from switch 328, contact 328a is switched into engagement with contact 328d which, over line 330 energizes the DC motor controller, and initiates the sewing machine cycle. When holddown plate 292 moves to position removed from the safety switch 290, the switch closes and the programming motor 264 is energized to initiate operation of the machine programmer 250. At the end of the sewing machine cycle and in response to energization of relay coil 328c, contact 328a is brought into engagement with contact 328e to initiate the functions associated with the end of the sewing machine cycle.

The control further includes provision for disabling the stitching function at such times that an abrupt change in the direction of the pattern is sensed such that the tangent servo mechanism 62 can change the heading of the sewing machine 68 to re-establish the desired right angle relationship to the tangent of the stitch path. Such abrupt change is required when turning the corners of certain patterns, as shown in the exemplary diamond pattern in FIGS. 19 and 20. The requisite tangent error signal is derived by the curvature of line 136a at the corner of the pattern. As to circuitry, the output line 314 from the resolver 142 (in addition to feeding the tangent amplifier 316) provides tangent error signals over line 322 and potentiometer 334 to the tangent voltage detector 336 which includes two pulsed output lines 338, 340. Output line 338 is connected to a timing relay 342 connected in line 330 for the DC motor controller 318. Output line 340 is connected to a stepping switch 344. Potentiometer 334 provides an adjustment for the threshhold level at which the tangent voltage detector 336 will provide a pulse output on both lines 338, 340. The provision of an output pulse on line 338 to timing relay 342 will interrupt the energization circuit for the DC motor controller by opening lines 330, thereby disabling the stitching mechanisms for a preset time interval determined by the setting of the timing relay 342. The interval is selected to enable the stitching mechanism to assume the new heading which is achieved simultaneously by the tangent amplifier 316 and the turntable servo mechanism 62. In a typical control, the pattern or line drawing 136b at the corner (see FIG. 20) extends around the corner such that after the timing relay 342 times out and the stitching mechanisms are once again enabled over line 330, stitching commences along the next course at the low speed programmed for the corner. When the scanning head goes past the heavy dark area 136b and once again senses the thin line 136a, stitching along the second course proceeds at high speed.

The pulse output derived over line 340 to stepping switch 344 provides a convenient means whereby the control is able to count certain pattern indicia (i.e., a heavy black pip indicative of a corner); and, depending on the setting of the stepping switch 344, provide the requisite signal for completing a particular machine program. For example, for the illustrative diamond pattern (see FIG. 19), the stepping switch 344 is set at a count to disregard the pulse output derived on line 340 at the first, second and third corners of the pattern. But, at the last corner, contact 344a applies a pulse output on line 346 to the circuit 348 which activates the control to initiate the functions which occur at the end of the machine cycle. In the event that the widened line indicative of the corner is not programmed to initiate the end of the machine cycle, it is a relatively straightforward matter to include in the program a separate widened line and an appropriate threshhold control associated with the circuit 348 to initiate the cycle end sequence under control of the stepping switch 344.

When the tangent voltage detector 336 in association with the stepping switch 344 initiates the circuit response to complete the end of the cycle, the main control switch or relay 328 disrupts the energization circuit for the DC motor controller 318. Thus, under control of the tangent control detector 336, the main control switch 328 is operated to shut off the sewing machine motor until the programmer initiates the next cycle.

It will be appreciated that if the servo motors 120, 102 stop the machine in a position corresponding exactly to the cycle-end signal as represented by a widening of the pattern or trace, the resolver 142 would be in a rotational orientation corresponding to the generation of a large tangent error signal. This is a condition which would be undesirable to initiate the next cycle since the same could result in hunting by the control, and the inability of the control to determine the appropriate direction for correction in response to the sensing of further tangent error signals from the pattern as the next machine cycle starts. To avoid this unfavorable condition and to bring the sewing machine 68 into a heading generally favorable for starting the next sewing machine cycle, timing relay 342 allows the sensing of the final tangent voltage output pulse by detector 336 to continue the rotation of the turntable 40 via its servo mechanism for a relatively short time interval as determined by the setting of the timing relay 342. This continues the cycle for a short duration which is sufficient to orient the sewing machine head such that a small tangent error signal is generated at the start of the next cycle which can be readily sensed by the control.

As is generally understood, when the sewing machine cycle is completed, the needle 70 of the sewing machine must be positioned in its up or retracted position relative to the work to enable the work to be unloaded. To this end, the needle positioner 82 and the associated thread trimmer (not shown) function to assure that the needle 70 is in the upper position at the end of the machine cycle and to clip the thread such that the ejecting mechanism 150 may remove the work. The control is arranged such that as timing relay 342 is timing out, the DC motor controller 318 turns the sewing machine motor 72 at a low speed and circuit 348 over switch 328 and line 356 activates the needle positioner jogging circuit 358. When the needle positioner brings the needle in its up position, a signal is provided from circuit 358 to de-energize the DC motor controller. This is accomplished by connecting the output of circuit 358 over acceleration and deceleration control 320 and line 362 to the DC motor controller.

Referring now to FIG. 22, which is a timing diagram illustrating a number of the coordinated functions of the automated sewing machine and the related material handling system in a typical program or stitching cycle, a typical cycle may be considered to commence at the vertical line marked FIG. 10 and going to the corresponding vertical line, similarly marked. At the start of the machine cycle, the programmer 250 is on (segment 1) while the work clamp 88 which holds down the work on the turntable 40 is in its raised or clearance position (segment 3) under control of air cylinder 130 (FIG. 18). At this point in the cycle, the ejector 150 is in over the work (segment 2) in a pickup position (see the dotted line showing in FIG. 2); and while in that position, the ejector 150 is lowered into contact with the work under control of air cylinder 160 (segment 4). As the cycle progresses (segment 5), the ejector 150 moves the work out from beneath the holddown clamp 88 to clear the machine for receiving the next piece of work under control of the transfer and positioning head 176 (segment 6). When the work is positioned beneath the holddown clamp 88, the clamp moves downwardly under control of air cylinder 130 (segment 7) and the sewing machine cycle starts (segment 8). As the sewing machine cycle starts, air cylinder 200 raises the cradle associated with both the pickup head 174 and the transfer and positioning head 176 (segment 9), thereby lifting the transfer and positioning head 176. At the same time (see segment 10), head 176 is returned to the intermediate assembly station 172. Concurrently, the pickup head 174 is returned to the pickup position relative to the tray at station 170 (segment 11). Thereupon, cradle 194 is lowered under the influence of gravity by the porting of air cylinder 200 to atmosphere (segment 12) such that the pickup head 174 will engage the work at station 170. Next, the pickup head 174 is raised (segment 13) and moved to a drop-off position over the intermediate assembly station 172 (segment 14). When the pickup head 174 is in position over the intermediate assembly station, it is lowered (segment 15); and in the lowered position, the stripper 232 removes the work (segment 16). In advance of the pickup head 174 being lowered at the intermediate station (segment 15) and operation of the stripper (segment 16), the vacuum is turned on (segment 17) to assist in the stripping of the work from the pickup head 174 and to achieve precise orientation of the work at the intermediate assembly station 172. At this point in the cycle, the stripper 232 is once again raised (segment 18) and the work supporting carrier 178 including the two trays is moved to the full position shown in FIG. 2 (segment 19). Thereupon, heads 174, 176 are raised under control of the cradle 194 and air cylinder 200 (segment 20) and while the pickup head 176 is out of contact with the work, the air cylinder 228 associated with the pressure sensitive tape transport mechanism (FIGS. 15–17) is actuated (segment 21). Concurrently, the pickup head 174 is restored to its pickup position over the oriented tray at station 170 (segment 22) and again cylinder 200 is ported to atmosphere to lower the pickup head 174 into contact with the work (segment 23). While head 174 is at the pickup station 170, it is once again raised (segment 24). After it clears the stack of work, it is again moved forwardly to the intermediate assembly station 172 (segment 25). Thereupon, air cylinder 200 is once again ported to atmosphere to lower the pickup head 174 at the intermediate assembly station (segment 26) and stripper 232 is again actuated (segment 27), it being noted that the vacuum is still on at this point in the cycle (segment 17). Thereafter, stripper 232 is raised (segment 28), the vacuum is turned off (segment 29) and the carrier 188 for the trays is moved to the forward position (segment 30) shown by the dotted lines in FIG. 2 wherein the second tray is oriented at the pickup station 170. Thereupon, the programmer is turned off (segment 31), and the particular machine cycle is completed as described.

From the foregoing, it will be appreciated that the present invention provides an automated sewing machine and related material-handling system which is highly versatile and is capable of reproducing a wide variety of stitching patterns from corresponding line drawings with a high degree of accuracy, reliability, and repeatability. The machine is designed to weight the stitching cycle such that when stitching along a relatively straight or gradually curving course (which does not require large rotational adjustments of the turntable to maintain the desired trignometric relationship between the head and the stitching line), stitching goes forward at a high speed which may be adjusted in the first instance by the machine operator. However, when high speed stitching is not feasible due to the configuration of the stitch pattern, by the simple expedient of appropriate programming in the line drawing, the machine can be brought to a slow speed which slow speed is likewise adjustable by the machine operator. In those situations where it is not practical to continue stitching while adjusting the heading of the sewing machine in accordance with the dictates of the pattern, the programming built into the line drawing may be such as to completely disable the stitching mechanisms for a present time interval to enable the required correction to be achieved without stitching. Further, after stopping at a corner or other abrupt discontinuity in the stitching pattern, and re-orienting the sewing machine to assume a new heading with respect to the stitch pattern, the programming may be arranged such that stitching resumes at a slow speed to thereby avoid excessively shocking the equipment with the attendant possibility of damaging the work or introducing imperfections in the stitch line; and after a reasonable equilibrium condition is established for machine operation at slow speed, the programming may be arranged to bring the machine back to its high speed stitching for the next course. Finally, the machine has the capability due to the flexibility of its controls to enable the operator to set up the overall machine cycle by programming the pattern to terminate the machine cycle. From the foregoing, it will be appreciated that the underlying concept of deriving a tangent error signal from the X and Y coordinates and the novel control of the present invention enables the instantaneous correction of the rotational orientation of the turntable, the ability to stop at corners and make large corrections in the angular position of the turntable and the capability of setting up an overall machine cycle.

A latitude of modification, change, and substitution is intended in the foregoing disclosure and in certain instances, some features of the invention will be used without a corresponding use of other features. Accordingly, it is appropriate that the appended claims be construed broadly and in a manner consistent with the spirit and scope of the present invention.

What we claim is:

1. A sewing machine comprising a work-supporting table, stitching mechanisms mounted on said table and including a needle movable through a stitch-forming stroke at a stitching location, means mounting said table and said stitching mechanisms for rotation through 360° about a table axis substantially coaxial with said needle, a work clamp movable relative to said table to move work past said stitching location to provide a stitching pattern in said work, an overhead frame mounted above said table, means for suspending said work clamp from said overhead frame such that said stitching mechanisms may rotate and stitch through 360° about said table axis, a movable pattern-supporting platen carried by said overhead frame and being operatively connected to and movable with said work clamp, clamp control means including first means for moving said work clamp and said pattern-supporting platen in accordance with the X coordinate of said stitching pattern and second means for simultaneously moving said work clamp and said pattern-supporting platen in accordance with the Y coordinate of said stitching pattern, and table control means for rotating said table in accordance with the tangent function of the X and Y coordinates of said stitching pattern.

2. A sewing machine according to claim 1 wherein said suspending means includes first and second sets of ways disposed at right angles to each other, said first set of ways being attached to said overhead frame and said second set of ways being movably mounted on said first set of ways, the suspending means for said work clamp being operatively connected to said second set of ways.

3. A sewing machine according to claim 2 including a pattern-controlled carrier movably mounted on said second set of ways, the suspending means for said work clamp being directly connected to said carrier.

4. A sewing machine according to claim 3 wherein said clamp control means includes a first servo-control motor operatively connected to said second set of ways for moving the same along said first set of ways and a second servo-control motor operatively connected to said carrier for moving the same along said second set of ways.

5. In a sewing machine, a work-supporting table, stitching mechanisms mounted on said table and including a motor and a needle movable through a stitch-forming stroke at a stitching location, a work clamp movable relative to said table for moving work past said stitching location, said work clamp being suspended above said table, clamp control means for moving said work clamp in accordance with the X and Y coordinates of a stitch pattern, a movable platen for supporting said stitch pattern being operatively connected to and movable with said work clamp, electro-optical scanning means arranged to read a line drawing corresponding substantially to said stitch pattern and providing an X coordinate control signal and a Y coordinate control signal, X coordinate servo means responsive to said X coordinate control signal and operatively connected to said work clamp for moving same in accordance with the X coordinate of said stitch pattern, Y coordinate servo means responsive to said Y coordinate control signal and operatively to said work clamp for moving same in accordance with the Y coordinate of said stitch pattern, means mounting said table and said stitching mechanisms for rotation through 360° about said needle, means for deriving a tangent function control signal from said electro-optical scanning means and tangent function servo means responsive to said tangent function control signal and operatively connected to the mounting means for said table and said stitching mechanisms for moving same in accordance with the tangent function of said stitch pattern.

6. A sewing machine according to claim 5 wherein the mounting means for said stitching mechanisms includes a turntable and the means for deriving said tangent function control signal includes a resolver synchronized to the rotational position of said turntable and receiving its input from said electro-optical scanning means.

7. A sewing machine according to claim 6 including means for synchronizing said X coordinate and Y coordinate servo means to the speed of said motor of said stitching mechanisms such that the movement of the work past said stitching location by said work clamp is synchronized to the rate of stitching as established by the speed of said motor of said stitching mechanisms.

8. A sewing machine according to claim 7 wherein said coordinating means includes an X coordinate feed rate multiplier connected to said X coordinate servo means, a Y coordinate feed rate multiplier connected to said Y coordinate servo means and a speed sensor connected to said motor and providing respective input signals to said feed rate multipliers.

9. A sewing machine according to claim 8 including an adjustable potentiometer connected between said speed sensor and said feed rate multipliers for varying the respective input signals thereto for adjusting the rate at which said work is moved past said stitching mechanisms.

10. A sewing machine according to claim 7 wherein said motor includes means for providing at least a high speed stitching rate and a low speed stitching rate and means responsive to said electro-optical scanning means and the reading of said line drawing for establishing one or the other of said stitching rates.

11. A sewing machine according to claim 10 including first means for adjusting said high speed stitching rate over a predetermined range and second means for adjusting said low speed stitching rate over a predetermined range. ccording 12. A sewing machine comprising a support, a turntable mounted on said support for rotational adjustment through 360° about a turntable axis, a sewing machine mounted on said turntable for movement therewith and including a drive motor and stitching means movable through a stitch-forming sequence at a predetermined stitching station relative to said turntable axis and under control of said drive motor, a movable work feeder suspended above and overlying said turntable for moving work past said stitching station to provide a stitching pattern in said work, said work feeder being movable with respect to said turntable, respective work feeder and turntable control means for moving said work feeder and for rotating said turntable in coordinated relation to each other, a servo control system operatively connected to said work feeder and said turntable for moving said work feeder in accordance with the X and Y coordinates of said stitching pattern and for simultaneously rotationally adjusting said turntable in accordance with the corresponding tangent function of said stitching pattern, and electro-optical sensing means responsive to indicia corresponding generally to said stitching pattern and in controlling relation to said servo control system.

13. A sewing machine according to claim 12 including an overhead carrier, means movable mounting said carrier on said support for movement in two directions corresponding to X and Y coordinates and means suspending said work feeder from said carrier.

14. A sewing machine according to claim 13 wherein said electro-optical scanning means includes a stationary scanning head and a movable indicia-supporting platen operatively connected to and movable in unison with said carrier.

15. A sewing machine comprising a support, a turntable mounted on said support for rotational adjustment about a turntable axis, a sewing machine mounted on said turntable for movement therewith and including a drive motor and stitching means movable through a stitching-forming sequence at a stitching station under control of said drive motor, a movable work feeder overlying said turntable for moving work past said stitching station to provide a stitching pattern in said work, a servo control system operatively connected to said work feeder and said turntable for moving said work feeder in accordance with the X and Y coordinates of said stitching path and for simultaneously rotationally adjusting said turntable in accordance with the corresponding tangent function of said stitching path, eletrooptical sensing means responsive to indicia corresponding generally to said stitching pattern and in controlling relation to said servo control system, means providing at least first and second work-storing means on said support adapted to receive corresponding first and second pieces of work, means providing an intermediate stacking and orienting station on said support, first transfer means arranged to pick said first and second piece and stack the same at said intermediate station, second transfer means arranged to move said stack from said intermediate station to said stitching station and programming means for initiating said stitch-forming sequence when said stack is moved to said stitching station.

16. A sewing machine according to claim 15 wherein the means providing said intermediate station includes a vacuum holddown, means for enabling said vacuum holddown during picking and stacking of said first and second pieces at said intermediate station and means for disabling said vacuum holddown during movement of said stack from said intermediate station to said stitching station.

17. A sewing machine according to claim 15 wherein the means providing said first and second work-storing means includes a shiftable work-supporting carrier movably mounted on said support, and means for shifting said carrier relative to said support to bring said first and second work-storing means in succession into a pickup station relative to said first transfer means such that said first piece may be picked and transferred to said intermediate station and then said second piece may be picked and transferred to said intermediate station to be stacked over said first pirce.

18. A sewing machine according to claim 15 wherein said first transfer means includes a pickup head movable between a pickup position overlying said pickup station to a drop-off position overlying said intermediate station and means for raising and lowering said pickup head when in said pickup and drop-off positions respectively.

19. A sewing machine according to claim 18 wherein said pickup head includes a work-contacting face, pressure-sensitive means on said work-contacting face operable to adhere to said work at said pickup station for picking up said work and stripper means on said pickup head and movable relative to said work-contacting face for stripping said work from said pickup head at said intermediate location.

20. A sewing machine according to claim 19 including means for periodically replenishing said pressure-sensitive means at said work-contacting face.

21. A sewing machine according to claim 15 wherein said second transfer means includes a transfer sled movable between a setdown position at said intermediate station and a delivery position at said stitching station.

22. A sewing machine according to claim 21 including means for raising and lowering said sled when in said intermediate and stitching station such that said sled may engage said stack in said intermediate station and slide the same into said stitching station for transfer to and engagement by said work feeder.

23. A material picking, assembling and transferring device comprising a support, means providing at least first and second material-storing means adapted to receive corresponding first and second stacks of pieces of material, means providing an intermediate stacking and orienting station on said support, first transfer means arranged to pick pieces from said first and second stacks in succession and assemble the same at said intermediate station, means at said intermediate station for holding said first piece in a prescribed orientation during pickup and assembly thereover of said second piece, and second transfer means operable in timed relation to said first transfer means for removing the assembled pieces from said intermediate station.

24. A device according to claim 23 wherein the holding means includes a vacuum holddown, means for enabling said holddown during the assembly of said first and second pieces at said intermediate station and means for disabling said holddown when the assembled pieces are engaged by said second transfer means.

25. A device according to claim 24 wherein the means providing said first and second work-storing means includes a shiftable work-supporting carrier movably mounted on said support, and means for shifting said carrier relative to said support to bring said first and second work-storing means in succession into a pickup station relative to said first transfer means such that said first piece may be picked and transferred to said intermediate station and then said second piece may be picked and transferred to said intermediate station to be stacked over said first piece.

26. A device according to claim 23 wherein said first transfer means includes a pickup head movable between a pickup position overlying said pickup station to a drop-off position overlying said intermediate station and means for raising and lowering said pickup head when in said pickup and drop-off positions respectively.

27. A device according to claim 16 wherein said pickup head includes a work-contacting face, pressure-sensitive means on said work-contacting face operable to adhere to said work at said pickup station for picking up said work and stripper means on said pickup head and movable relative to said work-contacting face for stripping said work from said pickup head at said intermediate location.

28. A device according to claim 27 including means for periodically replenishing said pressure-sensitive means at said work-contacting face.

29. A material picking and assembling device for at least two pieces of material comprising a support, a carrier, means mounting said carrier for movement relative to said support, means providing at least first and second material-storing means on said carrier adapted to receive corresponding first and second stacks of pieces of material, means for moving said carrier to bring said first and second material-storing means into a pickup station, means on said support providing a material-assembly station removed from said pickup station, holddown means at said material-assembly station for holding down said pieces of material during assembly, a pickup head, means including a mounting member mounting said pickup head for transfer movement between a pickup position overlying said pickup station and a drop-off position overlying said material-assembly station, and means for raising and lowering said mounting member when said pickup head is in said pickup and drop-off positions respectively.

30. In a sewing machine, stitching mechanisms including a multiple-speed motor drive and a needle movable through a stitch-forming stroke at a stitching location at at least high and lower stitching rates, a movably mounted work clamp for moving work past said stitching location in accordance with the X and Y coordinates of a stitch pattern, electro-optical scanning means arranged to read a line drawing corresponding substantially to said stitch pattern and providing an X coordinate control signal and a Y coordinate control signal, X coordinate servo means responsive to said X coordinate control signal and operatively connected to said work clamp for moving the same in accordance with the X coordinate of said stitch pattern, Y coordinate servo means responsive to said Y coordinate control signal and operatively connected to work clamp for moving same in accordance with the Y coordinate of said stitch pattern, means for synchronizing said X and Y coordinate servo means to the speed of said motor drive such that the movement of said work past said stitching location is synchronized to the rate of stitching as established by said motor drive and is normally at said higher stitching rate, means including a turntable mounting said stitching mechanisms for rotation about said needle, means for deriving a tangent function control signal from said electro-optical scanning means and tangent function servo means responsive to said tangent function control signal and operatively connected to said turntable for moving same in accordance with the tangent function of said stitch pattern.

31. A sewing machine according to claim 30 wherein said line drawing and the corresponding stitch pattern includes at least first and second courses meeting at a corner, said line drawing including speed-change indicia along said first course in advance of said corner and means responsive to the sensing of said indicia by said electro-optical scanning means and in controlling relation to said motor drive for changing to said lower stitching rate as the corner of the stitching pattern approaches said stitching location.

32. A sewing machine according to claim 31 including means operable in response to tangent function control signals in excess of a predetermined threshhold and as the corner of the stitching pattern approaches said stitching location for disabling said stitching mechanisms such that said turntable brings said stitching mechanisms into the required orientation relative to said second course under the control of said tangent function servo means prior to enabling said stitching mechanisms for stitching along said second course.

33. A sewing machine for stitching a pattern having first and second courses meeting at a corner comprising a work-supporting table, stitching mechanisms mounted on said table and including a multiple-speed drive and a needle movable through a stitch-forming stroke at a stitching location for stitching at at least high and low speeds, means mounting said table for rotation about a table axis substantially coaxial with said needle, a work clamp arranged relative to said table to move work past said stitching location to stitch along at least said first course of said pattern, clamp control means for moving said work clamp relative to said needle as a function of said pattern, table control means for rotating said table about said needle as a function of said pattern, said stitching mechanisms operating at said high speed along the major extent of said first course, means responsive to the approach of said corner to said stitching location to slow said stitching mechanisms to said low speed and means operable thereafter to disable said stitching mechanisms and to actuate said table control means for rotating said table to abruptly change the heading of said stitching mechanisms.

* * * * *